(12) United States Patent
Nomura et al.

(10) Patent No.: US 6,477,341 B2
(45) Date of Patent: Nov. 5, 2002

(54) CONTROL DEVICE FOR ELECTRONIC EQUIPMENT

(75) Inventors: Tatsuo Nomura, Soraku-gun; Kouki Fukuda, Nara; Syoichiro Yoshiura, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/795,694

(22) Filed: Feb. 28, 2001

(65) Prior Publication Data

US 2001/0028808 A1 Oct. 11, 2001

(30) Foreign Application Priority Data

Feb. 29, 2000 (JP) ........................ 2000-052876
Mar. 7, 2000 (JP) ........................ 2000-061407

(51) Int. Cl.[7] .................... G03G 21/00; H04N 1/00
(52) U.S. Cl. ........................ 399/81; 399/82
(58) Field of Search .................... 399/81, 82, 85; 361/681

(56) References Cited

U.S. PATENT DOCUMENTS

| 5,045,880 | A |   | 9/1991 | Evanitsky et al. ........ 399/82 |
| 5,264,948 | A |   | 11/1993 | Imoto .................. 358/474 |
| 5,390,005 | A | * | 2/1995 | Kimoto et al. ........... 399/81 |
| 5,614,993 | A |   | 3/1997 | Smith et al. ............ 399/81 |
| 5,669,040 | A |   | 9/1997 | Hisatake ................ 399/83 |
| 5,950,045 | A |   | 9/1999 | Nomura et al. ........... 399/81 |
| 6,263,173 | B1 | * | 7/2001 | Nakamura et al. ......... 399/82 |
| 6,308,023 | B1 | * | 10/2001 | Nomura et al. .......... 399/81 |

FOREIGN PATENT DOCUMENTS

| EP | 0902582 A | 3/1999 |
| EP | 1063839 | 12/2000 |
| JP | 62205417 A | 9/1987 |
| JP | 10-105001 | 4/1998 |
| JP | 10-143024 | 5/1998 |

* cited by examiner

*Primary Examiner*—Sophia S. Chen
(74) *Attorney, Agent, or Firm*—Edwards & Angell, LLP; David G. Conlin; William J. Daley, Jr.

(57) ABSTRACT

A control panel of a digital copier capable of inputting jobs according to a plurality of different processing modes includes a touch panel color liquid crystal display device. This display device displays setting information of a current processing mode and icons representing jobs according to newly inputted processing modes, in a concealed state. In the vicinity of the display device are provided mode selection keys for selecting processing modes. The display device also displays information on each job according to one of the processing modes in a color having the same hue as that of a display color of each mode selection key, thereby displaying information on a job in process and standby jobs with programmed processes in an intelligible state to users.

21 Claims, 37 Drawing Sheets

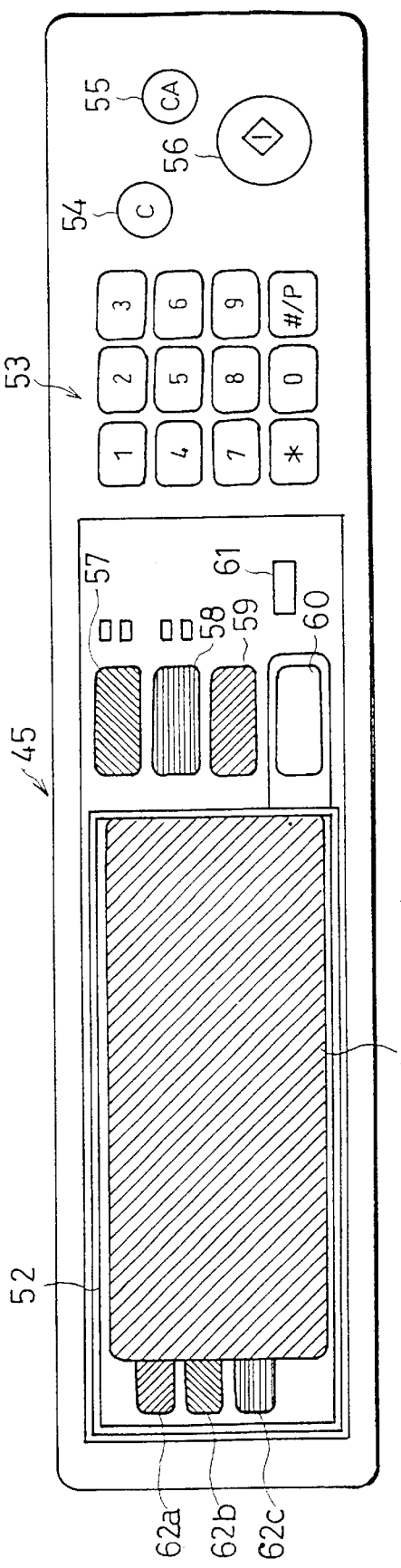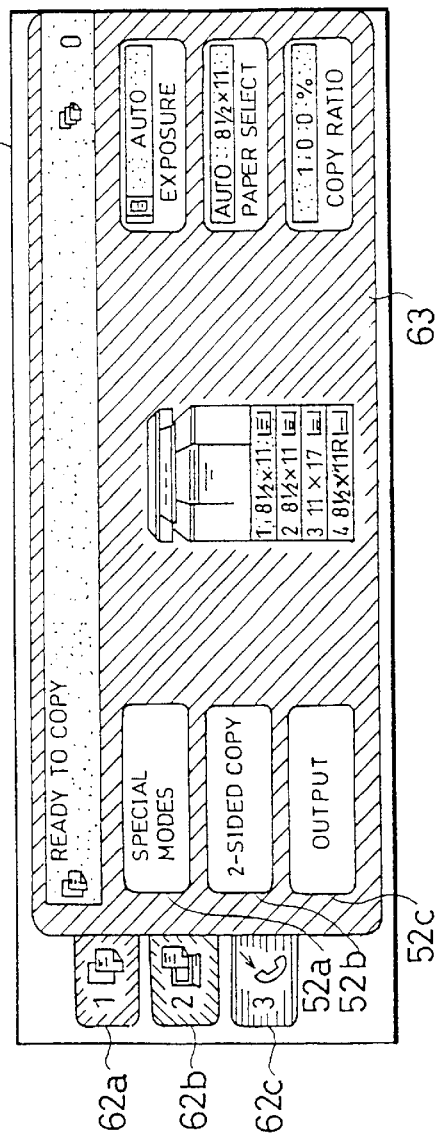
FIG.4(a)
FIG.4(b)

CONTROL DEVICE FOR ELECTRONIC EQUIPMENT

FIELD OF THE INVENTION

The present invention relates to a control device for operating electronic equipment including a digital image forming apparatus capable of various operation modes such as a printer mode, a copying mode and a facsimile mode, for example.

BACKGROUND OF THE INVENTION

In recent years, various kinds of electronic equipment have been digitized, which triggered the development of multi-function electronic devices. For example, a digital image forming apparatus is an example of the electronic devices, which has not only a usual print mode (printer function) but also a copying mode and facsimile (fax) mode together in a single apparatus. Such a digital image forming apparatus is hereinafter referred to as a "combined machine".

Furthermore, the multi-function combined machine is capable of diverse processes for each mode. For example, among the above modes, as far as the copying mode is concerned, not only the facility of simply copying an image of an original document but also a variety of image editing facilities (modes) such as color conversion, image synthesis, image separation and image deletion have readily been attained.

Thus, multi-function electronic equipment has been realized, and a single apparatus can therefore contain the different facilities of more than one electronic devices. Accordingly, it is no longer necessary to purchase several different devices for the facilities, thereby reducing space to place the electronic devices.

When a user operates the electronic device thus having more than one facilities mounted thereon, there is a call for such operability as to allow each user to properly select a facility suited to his or her purposes, out of relatively large number of facilities.

Therefore, a general electronic device is provided with a control device for setting processing modes and various conditions with regard to the processing modes. The control device is made up of a display for displaying a plurality of facilities and conditions, and a controller, and by operating the controller which includes keys, buttons, etc., while watching the display, target facilities and conditions can appropriately be selected and set.

Further, the control devices for electronic devices frequently used today include a dual-purpose touch panel as a controller and a display. This touch panel displays setting options which are themselves controllable (selectable) keys, direct touch of which enables a user to select and set a desired facility. Consequently, in the case of a particular guided control such that a plurality of conditions are gradually selected and set item by item, the controllable keys can be displayed in the same area as required, thereby increasing operability when compared to an arrangement having a display and a controller separately provided.

Further, even when adopting the touch panel, the touch panel is more often used in combination with a normal controller (for example, a conventional controller having a plurality of keys) rather than used alone. Specifically, it can be arranged in such a manner that the normal keys are used to select modes or set conditions, as such controls are more preferably made by the normal keys, and the touch panel is used for the guided control as discussed above. By thus providing the touch panel and the normal key controller, and dividing controls between them depending on a type of control required, easier and safer control can be attained.

However, the multi-function electronic device poses a problem such as highly complicated operations in reality, because, when a user attempts to achieve an operation under a desired condition with a target mode, the user is required to select a proper mode or condition out of quite a large number of choices.

Particularly, when sharing an electronic device among a large number of unspecified users, it is often the case that, even if the device can be controlled through a controller while viewing the content of a display, a user of the less frequent use or a beginner user has no idea how to select a key from the display content, thereby greatly reducing operability or availability of the device.

Further, in an electronic device having a large number of facilities are provided a considerably large number of condition setting patterns. An attempt to fully grasp such condition setting patterns requires extensive experiences and skills, and therefore, only a skilled person can grasp most of the condition setting patterns. In this manner, it is the reality that the beginner user needs to ask a specialist how to operate the device, or operate the device by him/herself step by step with the help of a user's manual, which, in either case, require complicated and time-consuming work, thus failing to sufficiently increase operability.

Therefore, for example, the recent commercial models of the electronic devices, in order to increase operability, include display control facilities for mounting or connecting a relatively large display device with respect to a control (display) section, and kindly guiding a user in obtaining information on operating procedures, with images and messages on the display. By thus including the display control facilities, a large amount of information such as images and messages related to operations can be displayed on a relatively large display section for guidance, thereby allowing a user to utilize a device with relief.

However, a problem arises when using a monochromatic display as a display screen in order to intelligibly display a large amount of guidance information on the large display, because there is a limit in attaining display in gray-scale representation alone, which prevents the intelligible display for guidance of all the diverse modes and facilities.

In order to solve the foregoing problems, the inventors of the present application have proposed an input device as shown below, which is disclosed in Japanese Unexamined Patent Publication No. 15400/1999 (Tokukaihei 11-15400 published on Jan. 22, 1999). This input device includes a liquid crystal display panel of a relatively large size which is mounted on a control panel. On the liquid crystal display panel, an external outline of a device and peripheral devices is displayed in a substantially central part thereof, while displaying information on the device on a periphery of the outline. In addition, when there is a change in the state of the device, necessary information for a user is displayed as information in the forms of images and messages on the liquid crystal display panel, and by successively changing these displays is offered guidance on operations.

With the foregoing device, the state of the device can intelligibly be displayed for guidance, thereby providing customers with commercial products of high operability. However, this device still has such problems that information for detailed display should be prepared in advance and that a huge amount of image information is provided for display. Further, a beginner may possibly be impressed such that information according to the monochromatic display alone is insufficient for his/her understanding, and moreover, it is likely that the beginner may hesitate to use the device itself.

Therefore, in the case of current image forming apparatuses such as a combined machine, by utilizing a color display device (a multi-color display device and a display control device) capable of display a plurality of colors, the display of guidance to operations intelligibly to a user.

For example, Japanese Unexamined Patent Publication No. 143024/1998 (Tokukaihei 10-143024 published on May 29, 1998) discloses a technique of equipping a control display device which is mounted on a combined machine having a plurality of processing modes, with a display having LED backlight, and allowing the control display device to light a LED of a distinctive color for each operating mode so as to instantaneously grasp various operating modes.

However, the control display device of the above publication No. 10-143024 is arranged simply to change the display color in accordance with the processing mode. More specifically, in the foregoing device, it is easy to check the processing mode itself adopted in the current job in process; however, the problem is that information such as the presence of second and later standby jobs and information of processing modes related to such standby jobs cannot be checked.

Further, another prior art reference is, for example, Japanese Unexamined Patent Publication No. 105001/1998 (Tokukaihei 10-105001 published on Apr. 24, 1998) which discloses a copy machine having a multi-job mode as shown below. This copy machine has a color display device and a program copying mode mounted thereon. Specifically, when programming, the color display device displays guidance to the content of the program copying mode with a color corresponding to each copying mode programmed.

However, in the copy machine disclosed in the Publication No. 10-105001, it is arranged simply to display the content of the program when programming another job during process of a predetermined job, and information on processing modes in relation to second and later standby jobs cannot readily be checked or grasped.

Further, a technique of increasing operability in electronic devices as discussed below is disclosed in Japanese Unexamined Patent Publication No. 205417/1987 (Tokukaisho 62-205417 published on Sep. 10, 1987). The publication discloses a digitizer for editing an image to be copied based on an original document to be set in a copy machine, which includes a mode information input section having more than one types of function keys provided thereon, and light emitting bodies each of which is disposed in a position corresponding to each function key. In addition, a sequential operation of the light emitting bodies in a display section enables a user to grasp as to which function key should be controlled next, thereby increasing operability.

However, the technique of the Publication No. 62-205417 merely indicates the sequence of operation of the function keys by the flashing of the light emitting bodies, and it is likely that a user may not be able to control the function keys while following the flashing speed of the light emitting bodies. Moreover, it is also the problem that the display section cannot clearly show information on the sequence of operation of the function keys. Consequently, the technique is not sufficient for intelligibly offering guidance to a user as to, for example, the operation of an electronic device which is an advanced multi-function device requiring complicated operations.

SUMMARY OF THE INVENTION

It is a first object of the present invention to provide a control device of electronic equipment capable of carrying out jobs according to a plurality of different processing modes, and of displaying information on a job currently in process and information on a job with a programmed processing in an intelligible state for a user.

Further, it is a second object of the present invention to provide a control device of electronic equipment which allows a user, who is not used to operations, to carry out a plurality of different processing modes, where the user can readily and properly operate various setting processes which are necessary in setting a processing mode.

In order to attain the first object, the control device of electronic equipment according to the present invention, which is capable of carrying out jobs according to a plurality of different processing modes, includes: information input means for inputting information on the jobs; and multi-color display means for displaying information on the jobs in a different color representing each processing mode, wherein the multi-color display means simultaneously displays information on a job currently in process and information on a job of a programmed processing in display colors each of which represents a processing mode for each job.

With the foregoing arrangement, the multi-color display means displays information on a job in a different color representing each corresponding processing mode, thereby enabling a user to promptly and properly check and recognize information on a processing mode, simply by looking at a display color on the multi-color display means.

Further, the multi-color display means is arranged to simultaneously display the information on a job currently in process and the information on a job of a programmed processing in display colors each of which represents a processing mode for each job, thereby enabling a user, in case where a new job according to a different processing mode is programmed while processing a certain job, to check not only information on the job currently in process but information on the new job such as the type of processing mode to be adopted in the new job. Namely, even when using electronic equipment capable of simultaneously processing a plurality of jobs, a user can readily check an operational status.

Further, in order to attain the second object, the control device of electronic equipment according to the present invention, which is capable of carrying out a plurality of different processing modes, includes: processing mode selection means for selecting a desired processing mode out of the plurality of processing modes; item selection means which are provided so as to correspond to a plurality of setting items to be set for the execution of the processing mode; and execution instructing means for instructing the device to carry out the processing mode, wherein the item selection means and the execution instructing means are adjacently disposed in the sequence of selection or execution instructing steps, and a display color of each means forms part of a sequential variation in hues.

With the foregoing arrangement, a disposition and a hue in a display color are set so as to correspond to the sequence of selection or execution instructing steps of the item setting means and the execution instructing means, thereby enabling a user to judge an obvious operational sequence in each step, thus, even when requiring complicated steps in the operation of electronic equipment, enabling a user to readily and surely operating the device.

Further, even when each of the plurality of processing modes contains a relatively large number of setting items, a user simply needs to operate the item setting means and the execution instructing means in the sequence of hues and dispositions in each processing mode. Accordingly, the user is no longer required to memorize details such as a dedicated operation to an individual processing mode, the names of setting items and a setting sequence, thereby enabling the user to readily operating multi-function electronic equipment.

As discussed, by thus providing the foregoing control device to electronic equipment, an operation of which tends to be complicated, any user can operate the equipment readily and surely. Therefore, for example, in such a case where a large number of users share a small number of electronic equipment, it is possible to solve problems which may be caused by a user taking time in the operation of the equipment, such as troubling other users and reducing availability.

Additional objects, features, and strengths of the present invention will be made clear by the description below. Further, the advantages. of the present invention will be evident from the following explanation in reference to the drawings.

BRIEF DESCRIPTION OF THE DRAWINGS

FIG. 4(a) is an explanatory drawing schematically showing an external outline of a control panel in the digital copier, and FIG. 4(b) is an explanatory drawing showing an example of the display screen of a display device in the control panel.

DESCRIPTION OF THE EMBODIMENTS

FIRST EMBODIMENT

The following will explain one embodiment of the present invention with reference to drawings. In the present embodiment, an image forming apparatus (combined machine) having processing modes such as a copying mode, a printer mode and a facsimile (fax) mode will be explained as electronic equipment according to the present invention, though the present invention is not limited thereto. For example, an image forming apparatus may include either at least two of the foregoing three processing modes or other processing modes. Further, the present invention can also be applied in the same manner as in the foregoing combined machine when using another electronic device having a plurality of processing modes.

Figure 1:
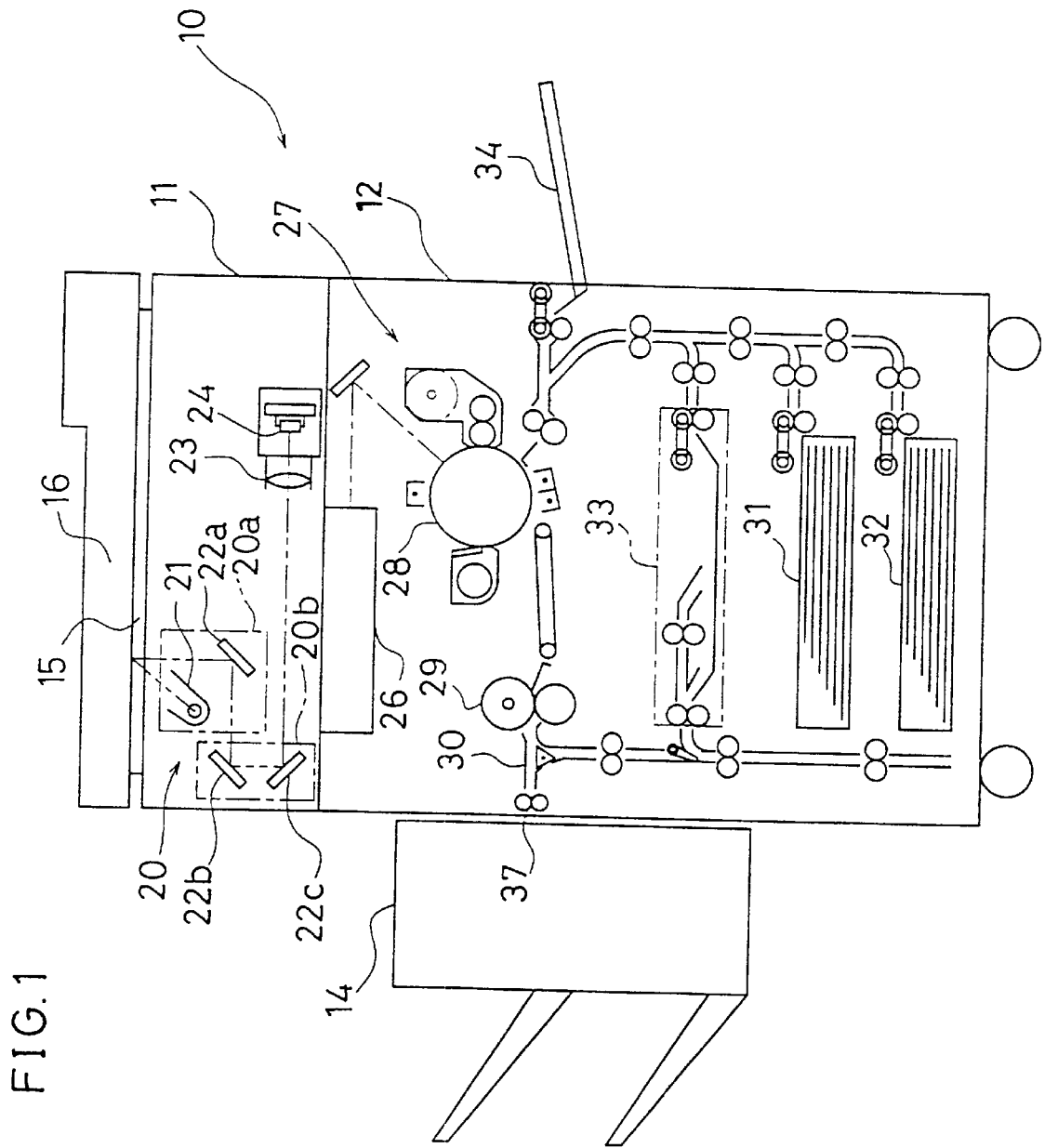
FIG. 1 is a cross sectional view schematically showing the overall configuration of a digital copier according to one embodiment of the present invention.

FIG. 1 is a cross sectional view showing the overall configuration of a digital image forming apparatus (combined machine) having a control panel. This digital image forming apparatus is a digital copier 10 which, in broad outline, is made up of a scanner section 11 for scanning a document image, a laser printer section 12 for generating an image so as to store it on a sheet of a transfer material, and an operation display section which will be discussed later.

The scanner section 11 includes an original table 15, an automatic single/double-sided document feeding device (RADF: Recirculating Automatic Document Feeder) 16, and a scanner unit 20. The original table 15 is a table made of transparent glass on which an original document (hereinafter, "original") is placed. The RADF 16 is a device for automatically feeding the original onto the original table 15. The scanner unit 20 is an original image readout unit for reading out an image of the original placed on the original table 15 by scanning. The original image read out in the scanner section 11 is transmitted as image data to an image data input portion which will be discussed later, where predetermined image processing is performed on the image data.

The RADF 16 is a device for automatically feeding single sheets of a stack of originals set on an original tray, which is not shown, onto the original table 15 in the scanner unit 20. Moreover, the RADF 16 includes: a feed path for a single-sided document; a feed path for a double-sided document; feed path switching means; a group of sensors for monitoring and controlling the state of originals passing through sections; and a control section for controlling them, all of which are not shown. With the foregoing arrangement, documents can be fed in such a manner that the scanner unit 20 reads either one side or both sides of a document according to an operator's choice. Since there conventionally have been numbers of patent applications and commercial models concerning the RADF 16, further explanation will be omitted.

The scanner unit 20 includes a lamp reflector assembly 21, a first scan unit 20a, a second scan unit 20b, an optical lens 23 and a CCD (Charge Coupled Device) 24. The lamp reflector assembly 21 is made up of a lamp and a reflector, which performs exposure of a document by illuminating a surface of the document with light emitted from the lamp. In order to guide a reflected image from the document to the CCD 24, the first scan unit 20a has a first reflective mirror 22a for reflecting reflected light from the document. The second scan unit 20b includes second and third reflective mirrors 22b and 22c for guiding a reflected image from the first reflective mirror 22a to the CCD 24. The optical lens 23 is a lens for converging a reflected image of the document, which was guided by the foregoing reflective mirrors, onto the CCD 24. The CCD 24 is a photoelectric transfer device for converting the reflected image of the document into an electric picture signal.

The scanner section 11 has an arrangement in which an associated operation of the RADF 16 and the scanner unit 20 successively places originals to be read out on the original table 15, while moving the scanner unit 20 along the underside of the original table 15 so as to read out an original image. Specifically, the scan is controlled in such a manner that the first scan unit 20a moves at a constant velocity V along the original table 15 from the left to the right, while the second scan unit 20b moves at half the rate of velocity V, i.e., V/2, in parallel in the same direction. Thus, the image of the original placed on the original table 15 is successively focused onto the CCD 24 for every one operation line, and on this CCD 24 is read out the image by a line scan method.

Image data obtained from the readout of the original image in the scanner unit 20 are transmitted to an image processor which will be discussed later, where various types of image processing are performed. Thereafter, the image data subjected to image processing are temporarily stored in a memory in the image processor. Then, in accordance with output instructions, the image data stored in the memory are loaded and transmitted to the laser printer section 12 where an image is formed on a sheet of a transfer material.

The laser printer section 12 is made up of a transport system for transporting sheets, and an image generator section 27 for generating an image. The image generator section 27 includes a laser writing unit 26, and an electrophotographic process section 28 for forming an image.

The laser writing unit 26 includes, though not shown, a semiconductor laser beam source, a polygonal mirror and an f-θ lens. The semiconductor laser beam source is a beam source for emitting laser beams in accordance with either image data which were read out by the scanner unit 20 and stored in the memory or image data transmitted from an external device. The polygonal mirror having mirrors disposed in a polygonal state deflects the laser beam at an equi-angular velocity. The f-θ lens is a lens for correcting the laser beam deflected at an equi-angular velocity by the polygonal mirror in such a manner that the laser beam is deflected at an equi-angular velocity on a photoreceptor drum constituting the electrophotographic process section 28.

Further, the electrophotographic process section 28 includes, though not shown, a charger, a developing device, a transfer device, a cleaning device and a charge eraser, which are provided around the photoreceptor drum.

Meanwhile, the sheet transport system includes a transporter portion, cassette feeders 31 and 32, a manual paper feeder 34, a fixing device 29, a re-feeding path 33 and a transport switch portion 30. The transporter portion is a member for transporting a sheet to a transfer position in the electrophotographic process section 28 where the transfer device is provided. The cassette feeders 31 and 32 are members for storing sheets and feeding a sheet to the transporter portion, which form a multi-paper feeder unit. The manual paper feeder 34 is a member for feeding a sheet of a desired size as appropriate by hand. The fixing device 29 is a member for fixing an image or a toner image in particular, formed on the sheet after transfer. The re-feeding path 33 is a transport path for reversing a sheet and refeeding the sheet when forming another image on the rear side of the sheet after fixing. The transport switch portion 30 is a member for selectively transporting the transported sheet either in a direction of a discharge roller 37 or in a direction of the re-feeding path 33. Further, on a downstream side of the fixing device 29 is provided a post-processing device 14 for receiving a sheet having an image recorded thereon and applying predetermined processing to the sheet.

In the laser writing unit 26 and the electrophotographic process section 28 in the image generator section 27, the image data loaded from the image memory are supplied to the laser writing unit 26 so as to form an electrostatic latent image by scan of the laser beam on the photoreceptor drum that is the electrophotographic process section 28. The latent image is visualized with toner, and the toner image is electrostatically transferred and fixed onto the sheet transported from either one of the feeders of the multi-paper feeder unit. The sheet thus having an image formed thereon is transported from the fixing device 29 into the post-processing device 14 via the discharge roller 37.

(Explanation of Circuits in the Image Processor)

Next, the following will explain configuration and function of an image processor for performing image processing on read-out original image information in the digital copier 10.

Figure 2:
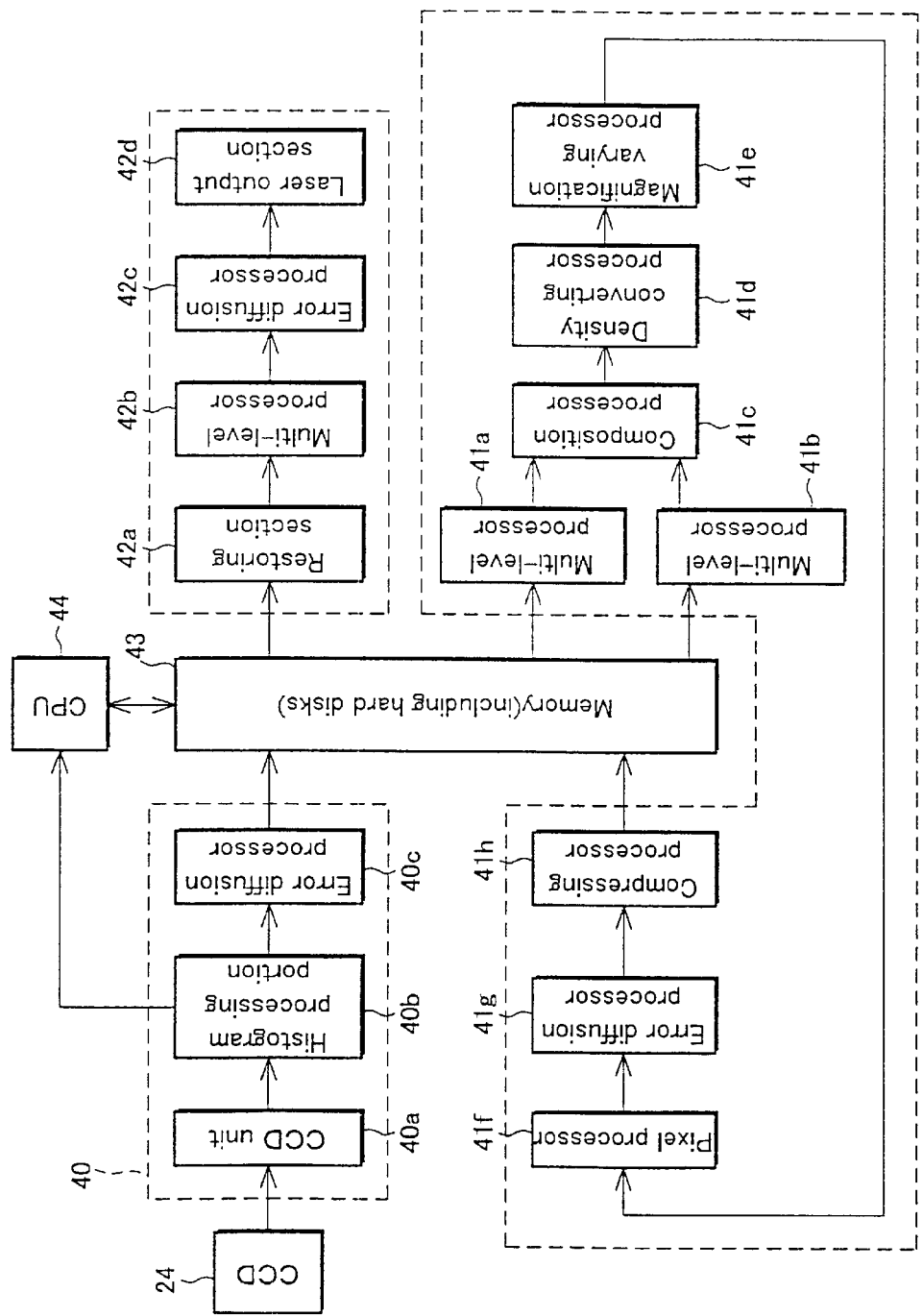
FIG. 2 is a block diagram for explanation of an image processor in the digital copier.

FIG. 2 is a block diagram showing the image processor contained in the digital copier 10 of FIG. 1. This image processor is made up of an image data input section 40, an image processing section 41, an image data output section 42, a memory 43 including RAM (Random Access Memory), hard disks, etc., and a central processing unit (CPU) 44.

The image data input section 40 has a CCD portion 40*a*, a histogram processor 40*b* and an error diffusion processor 40*c*. The image data input section 40 binarizes the image data of an original read through the CCD 24, so as to obtain digital binary data and a histogram thereof, while performing processing of the image data according to an error diffusion method, thereby temporarily storing the image data subjected to the processing in the memory 43.

In the CCD portion 40*a*, after performing analog to digital (A/D) translation of analog electric signals corresponding to pixel densities in the image data, a MTF (Modulation Transfer Function) correction and a black and white correction or a gamma correction are performed. The image data thus obtained are outputted as digital signals having 256 gray-scale levels (8 bits) to the histogram processor 40*b*.

In the histogram processor 40*b*, the digital signals outputted from the CCD portion 40*a* are added for each level of the pixel density of 256 gray-scale levels, so as to obtain histogram data as density information. The histogram data are transmitted to the CPU 44 as required. In addition, the image data are transmitted to the error diffusion processor 40*c*.

In the error diffusion processor 40*c*, by the error diffusion method which is one type of pseudo intermediate processing, i.e., a method of using a binary error to determine binary values for adjacent pixels, the digital signal of 8 bits outputted from the CCD portion 40*a* is converted into a digital signal of 1 bit (binarization). This processing corresponds to a re-distribution computation for accurately reproducing local area density in an original.

Next, the following will explain the image processing section 41. The image processing section 41 has multi-level processors 41*a* and 41*b*, a composition processor 41*c*, a density converting processor 41*d*, a magnification varying processor 41*e*, a pixel processor 41*f*, an error diffusion processor 41*g*, and a compressing processor 41*h*. This image processing section 41 is a processor to finally convert the inputted image data into image data as desired by an operator, and image data are processed through the image processing section 41 until finally stored into the memory 43 as the completely converted output image data. Note that, the processors included in the image processing section 41 function as required, and therefore, may not function if not necessary.

The multi-level processors 41*a* and 41*b* revert the binary data binarized through the error diffusion processor 40*c* to 256 gray-scale levels.

The composition processor 41*c* selectively performs logical operations for every pixel, i.e., logical OR, AND or exclusive OR. The target data of the logical operations are pixel data stored in the memory 43 and bit data from a pattern generator (PG) which is not shown.

The density converting processor 41*d* arbitrary sets an arbitrary relationship between the input density and output density with respect to the data signal of 256 gray-scale levels based on a predetermined gradation converting table The magnification varying processor 41*e* performs interpolation with respect to pixel data to be inputted based on a designated magnification ratio, thereby obtaining pixel data (density values) for the target pixels after magnification. The interpolation is performed in such a sequence that magnification is performed first in a sub scan direction, and then in a main scan direction.

The pixel processor 41*f* performs various kinds of image processing with respect to the inputted image data and may collect information on data stream, such as extracting characteristics of the data, depending on processing.

The error diffusion processor 41*g* performs processing similar to that of the error diffusion processor 40*c* in the image data input section 40. The compressing processor 41*h* compresses the binary data based on so-called run-length coding. The compressing process of the image data is performed in the end when completing the final output image data.

Next, the following will explain the image data output section 42. The image data output section 42 has a restoring section 42*a*, a multi-level processor 42*b*, an error diffusion processor 42*c*, and a laser output section 42*d*. The image data output section 42 restores the image data stored in the memory 43 in a compressed state, to the original 256 gray-scale levels, while performing error diffusion based on 4-level data capable of gentler halftone representation than that of binary data, and transfers data to the laser output section 42*d*.

The restoring section 42*a* restores the image data which were compressed by the compressing processor 41*h*. The multi-level processor 42*b* performs processing similar to those of the multi-level processors 41*a* and 41*b* in the image processing section 41. The error diffusion processor 42*c* performs error diffusion with respect to the image data subjected to value multiplication by the multi-level processor 42*b*. The laser output section 42*d* converts digital image data into ON/OFF signals of a semiconductor laser based on a control signal from a sequence controller which is not shown, and transmits the ON/OFF signals to the laser writing unit 26. Further, the laser writing unit 26 controls the ON/OFF state of the semiconductor laser according to the ON/OFF signals, thereby writing an electrostatic latent image on the photoreceptor drum.

Note that, data dealt with in the image data input section 40 and the image data output section 42 are stored in the memory 43 basically in the form of binary data so as to save the storage capacity of the memory 43. However, the data can also be processes in the form of 4-level data, taking into consideration the degradation of the image data.

(Explanation of the Control Configuration of A Whole Digital Copier)

Figure 3:
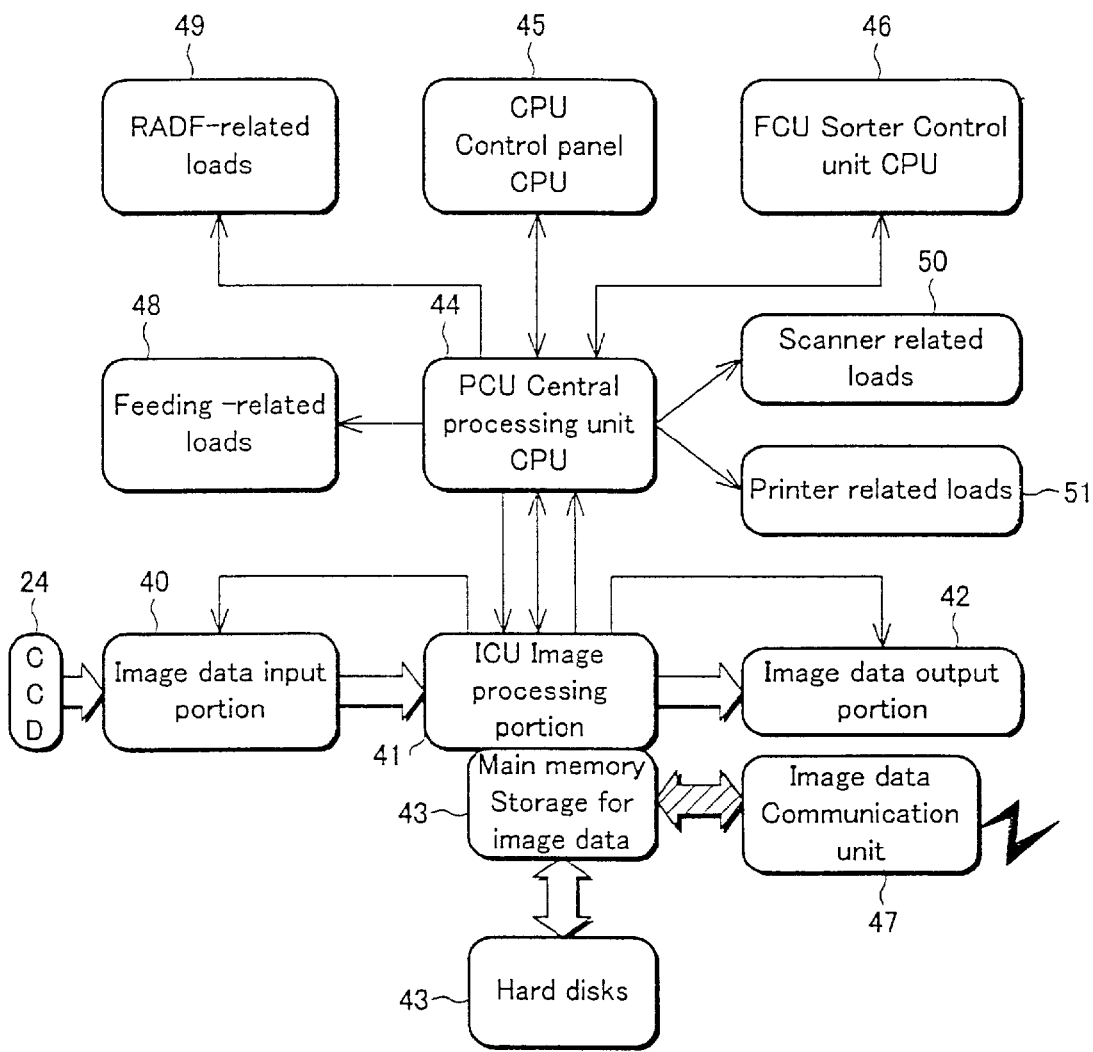
FIG. 3 is an explanatory drawing showing that the operation of each section of the overall digital copier is monitored by a central processing unit.

FIG. 3 is an explanatory drawing showing a central processing unit (CPU) 44 controlling the operations of all the components of the digital copier 10. Note that, explanation for the CCD 24, the image data input section 40, the image processing section 41, the image date output section 42, the image memory 43 and the central processing unit 44 is the same as the foregoing explanation, and therefore will be omitted here.

The central processing unit 44 controls driving components making up the digital copier 10, such as the RADF 16, the scanner section 11 and the laser printer section 12, by a sequence control. In addition, the central processing unit 44 outputs control signals to each component while monitoring the state of each switch, sensor, etc., and performs the monitoring of the state of operations in the control panel 45, and various display controls.

For example, the central processing unit 44 is connected with feed related loads 48, RADF related loads 49, scanner related loads 50 and printer related loads 51, to each of which is outputted a signal for performing sequence control. The feed related loads 48 correspond to loads due to motors, clutches, switches, etc. The RADF related loads 49 correspond to loads due to motors, clutches, switches, etc., used in the RADF 16. The scanner related loads 50 correspond loads due to motors, solenoids, etc., used in the scanner section 11. The printer related loads 51 correspond to loads due to motors, solenoids, high-voltage output boards, etc., used in the laser printer section 12. Furthermore, the central processing unit 44 is connected with the control panel 45, a sorter control unit 46 and the image processing section 41, in a bidirectionally communicable state.

Further, in the present embodiment, inside the control panel 45 is separately provided a CPU for controlling processing. By bidirectionally communicating between the central processing unit 45 and the CPU, monitoring the content of control and controlling a display and the related components thereto are carried out in the control panel 45. Namely, the display control device is made up of the CPU and the central processing unit 44 in the control panel 45, and the display control device controls a display portion provided inside the control panel 45. In addition, a control section to be discussed later makes up information input means.

The control panel 45 transfers control signals to the central processing unit 44 in response to the copying mode (processing mode) the setting of which has been inputted by an operator. This causes the digital copier 10 to operate in the designated processing mode. In addition, a control signal showing the operational state of the digital copier 10 is transferred from the central processing unit 44 to the control panel 45. The control signal causes the control panel to display the current operational state of the device through a display section and the like to an operator.

The sorter control unit 46 is a control unit for controlling operations of the post-processing device 14 for sorting copied matters outputted from the digital copier 10. An image data communications unit 47 is a device for performing data transmission of (inputting/outputting) image information, image control signals, etc., with other digital image apparatuses, which makes up information input means. Note that, a communication method which is supported by the image data communications unit 47 may be not only a common wired connection but also wireless connection or optical communications connection, and a communication medium may also be selected from lines such as a public line, a network line, a one-to-one connection line.

FIG. 4(a) is an explanatory drawing showing an external outline of the control panel 45 in the digital copier 10. In the substantial center of the control panel 45, as shown in FIG. 4(b), a touch panel color liquid crystal display device capable of multi-color display (multi-color display means) 52 (hereinafter referred to as "display device 52") is provided. In a periphery of the display device 52 is provided a group of various processing mode setting keys which will be discussed later.

FIG. 4(b) is an explanatory drawing showing an example of the display screen of the display device 52 in the control panel 45. As shown in FIG. 4(b), on the screen of the display device 52, a basic frame (copy mode setting window) is constantly displayed for mode selection. As for operations, when a user directly touches an area on the screen representing a desired processing mode, as required, display on the liquid crystal screen subsequently changes so that one of the modes can be selected. In that case, the user touches with his/her finger, one of areas (52a to 52c, for example) representing a desired mode on the screen, thereby selecting the desired mode. Note that, the display device 52 is made up of a color display device capable of multi-color display.

Next, with reference to FIG. 4(a), a group of various setting keys which are provided on the control panel 45 will be briefly described. A ten-key numerical pad 53 is the keypad for inputting numerical information such as the number of sheets to be copied. A clear key 54 is the key for clearing conditions which, for example, have been inputted through the ten-key numerical keypad 53. A clear-all key 55 is the key for cancelling all the current setting conditions in the digital copier 10 so that standard conditions are restored. A start key 56 is the key for starting processing of the mode set through the foregoing keys, which is used mainly in the copying mode.

In FIG. 4(a), a group of three mode selection keys (keys which make up the processing mode selection means) disposed in a vicinity of the right hand side of the display device 52 include a printer mode key 57, a fax mode key 58 and a copying mode key 59, from the top to the bottom. In addition, a key disposed on the downside of the copying mode key 59 is a job status key 60 for displaying detailed information of jobs which are simultaneously processed (a job which is currently in process and a standby job are included). Further, a user setting key (custom settings) 61 which is disposed on the right hand side of the job status key 60 is used to adjust, for example, the standard conditions of the digital copier 10 to conditions which are desired by a user.

Note that, only one embodiment of the control panel 45 and the keys provided thereon have been described, and therefore, the type, number and disposition of keys provided on the control panel will undoubtedly vary depending on modes to be mounted on a combined machine such as the digital copier 10.

(One Embodiment of the Display of Information on A Plurality of Image Generation Modes)

The digital copier 10 is capable of a plurality of processing modes such as fax mode, printer mode and scanner mode, in addition to a normal copying mode. Note that, the fax mode is the mode for sending and receiving a facsimile, and the printer mode is the mode for forming an image based on image data and control data which are transmitted from an external device, and the scanner mode is the mode for transferring the image data read out by the scanner to a specific external device. When carrying out theses processing modes, the image data communications unit 47 described above sends or receives image information.

As explained with reference to FIGS. 4(*a*) and 4(*b*), on the control panel 45 of the digital copier 10 is mounted a color liquid crystal display device having a color display device (display device 52) as a means to inform a user of various information. The central processing unit 44 causes the display device 52 of the control panel 45 to display information via a CPU which is provided on the control panel 45 and not shown. Further, in accordance with conditions which have been inputted by an operator, the image generator section 27 is instructed to generate an image and record it on a sheet. In order to provide users with intelligible guidance information with regard to various processing modes on a display, the display device 52 is devised as follows.

In the display device 52 of the control panel 45, for example, it is set that display is distinguished by a color corresponding to each different information as follows: blue for information on the copying mode; green for information on the fax mode; and yellow for information on the printer mode. In addition, mode selection keys such as a printer mode key 57, a fax mode key 58 and a copying mode key 59 are also displayed with a color corresponding to each processing mode. Note that, the printer mode key 57, the fax mode key 58 and the copying mode key 59 are thus displayed with the corresponding colors not only when each mode selection key is illuminated by the light of the corresponding color, but also when each mode selection key is made of a material having the corresponding color, or coated with the corresponding color.

Here, the printer mode key 57, the fax mode key 58 and the copying mode key 59 are provided in a vicinity of the display device 52. This enables a user to simultaneously check the color of each processing mode displayed on the display device 52 and the color of each mode selection key. Consequently, even when using a combined machine capable of simultaneously processing a plurality of input jobs as in the case of the digital copier 10 according to the present embodiment, a user can check and recognize an operational state of the device (information displayed on a display) readily and surely, without largely shifting a line of sight. In FIGS. 4(*a*) and 4(*b*), in order to show an example of display with the corresponding color or representation in the corresponding color, portions having the same corresponding color are given a single type of hatching. For example, horizontal hatching is used to represent the fax mode including the fax mode key 58 and an icon 62*c*.

Note that, it is preferable that a color representing each processing mode can be changed as required, and set arbitrarily. A part for the display device 52, for example, may be controlled so that a display color corresponding to each processing mode can be changed by a CPU, etc., in the control panel, and further, parts for the mode selection keys 57, 58 and 59 may be controlled by changing, for example, a material of a portion corresponding to a key or type of a light emitting device inside the key.

Since it is thus possible to arbitrarily set a color corresponding to each mode, a difference in the setting environments of the combined machine 10 is suitably adjustable. For example, where there is a possibility of urgent fax transmission, a red color having relatively high prominence may be used to represent the fax mode, and on the other hand, where there is frequent but mainly not urgent fax transmission, a less prominent yellow color may represent the fax mode. Thus, color settings are adjustable as circumstances demand.

In addition, other than selecting from different types of colors, color settings may also be modified by controlling brightness and/or density in a single type of color. In that case, the present invention can be put into practice even when adopting a display device capable of display in limited types of colors, thereby increasing visibility compared to that in monochromatic display. Note that, in the case of the display device 52, only a representation in a plurality of colors (multi-color representation) is required, where full color display is not necessary. Consequently, a display device capable of display in at least as many colors (color variation by changing brightness and/or density are included) as practicable processing modes can utilize the complete facilities of the present invention. It goes without saying that a desirable embodiment of the present invention is such a display device that is capable of display in a wide variety of colors which largely exceed the number of processing modes (256 colors, for example) can realize a user interface with superior visibility.

Furthermore, in the present embodiment, a display device adopting a widespread touch panel color liquid crystal display device has been recited as the display device 52; however, any display devices capable of multi-color display may be adopted as well. Specifically, as far as a display portion is concerned, a display device having no touch panel facility may be adopted, and further, a display device other than a liquid crystal display device may be adopted.

FIG. 4(*a*) shows a state in which the copying mode is selected as a job currently in process (a first job), and the display device 52 as a whole is represented, for example, in blue which is the same color as that of the copying mode key 59 and represents the copying mode. Note that, in FIG. 4(*a*), keys corresponding to the same mode are given the same type of hatching.

Further, as shown in FIG. 4(*b*), in an area along the left hand side of the whole display area of the display device 52 are provided icons 62*a* through 62*c* which show jobs to be simultaneously processed (here, it is shown that three types of jobs are simultaneously processed). Namely, the icon 62*a* representing the job currently in process (first job), the icon 62*b* representing the processing mode (here, the printer mode) of the second standby job, and the icon 62*c* representing the processing mode (here, the fax mode) of the third standby job are disposed in this order. In addition, a setting window 63 for giving instructions on a new job (copying mode) is displayed largely in blue.

Note that, in an example shown in FIG. 4(*b*), as the number of jobs increases, for example, from a first job to a third job, the icons 62*a* to 62*c* corresponding thereto are shown in descending order, where icons for later jobs are located in a lower position; however, a display form is not limited thereto, and any display form in which the sequence of jobs is visibly discernible may be adopted. For example, the icons corresponding to respective jobs can be disposed in ascending order, where icons for later jobs are located in an upper position, or the icons may be located horizontally: from the right to the left, or from the left to the right.

Here, each of the icons 62a to 62c is displayed in the color corresponding to each processing mode. For example, when the printer mode and the fax mode are respectively set in yellow and green, the printer mode key 57 and the icon 62b are represented in yellow, and the fax mode key 58 and the icon 62c are represented in green.

The setting window 63 for giving instructions on a new job is displayed overlapping the icon 62a of the first job currently in process and the icons 62b and 62c of the second and third standby jobs, where portions concealed under the setting window 63 for giving instructions on a new job can be switched to display information on details of each job (input time and current status).

Figure 5:
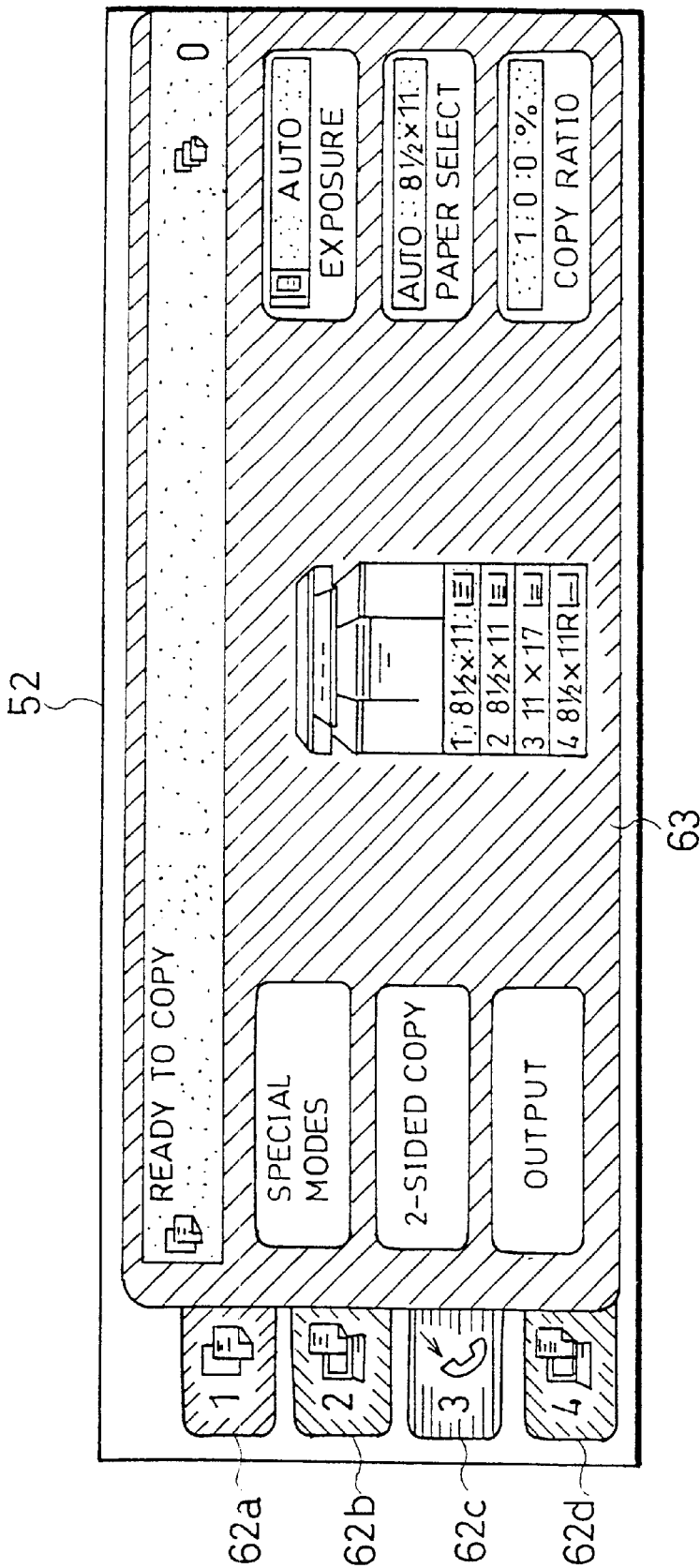
FIG. 5 is an explanatory drawing showing a display example of the display device.

FIG. 5 is an explanatory drawing showing an example of a display window in which display of FIG. 4(b) is changed to show display in a state after information on the printer mode was newly inputted as a fourth job via the image data communications unit 47. As shown in FIG. 5, an icon 62d showing a processing mode selected in the fourth job that was newly inputted is displayed along the downside of the icon 62c for the third job on the left hand side of the setting window 63 for giving instructions on a new job. Further, the icon 62d for the fourth job is represented in yellow corresponding to the printer mode.

Figure 6:
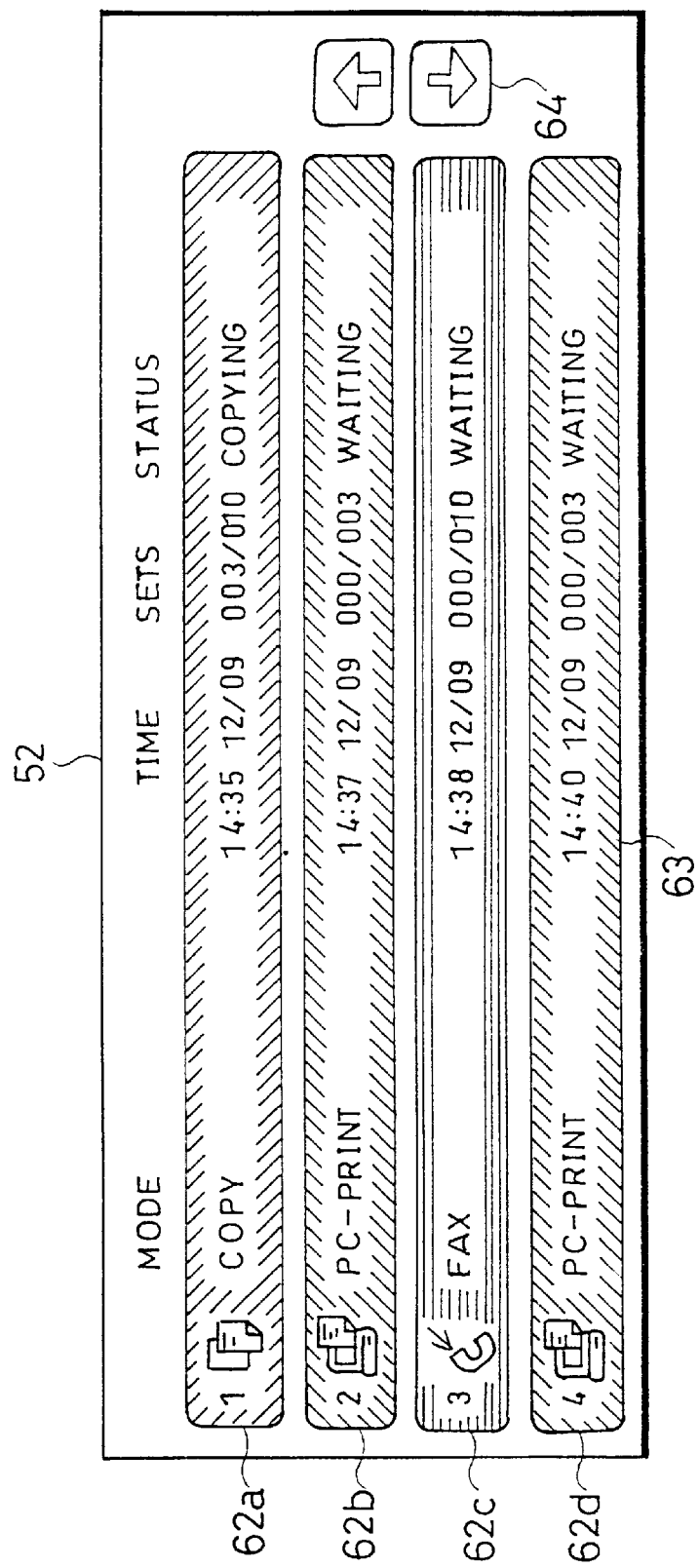
FIG. 6 is an explanatory drawing showing another display example of the display device.

As explained, the setting window 63 for giving instructions on a new job occupies a relatively large area in the display device 52; however, pressing down the job status key 60 conceals the setting window 63 for giving instructions on a new job, thereby, as shown in FIG. 6, making it possible to display information on details of each job which was concealed by the setting window 63. Consequently, even when the first job is currently processed, a user can check detailed operational status (information on standby jobs, etc.) of the digital copier 10 by, for example, pressing the job status key 60 as required.

Further, the icons 62a to 62d representing the jobs respectively include display of the type (processing mode) of each job, such as 'COPY'to the copying mode, 'PC-PRINT' to the printer mode, and 'FAX' to the fax mode, which are also capable of displaying information such as the programmed date and time, and processing status (during execution or standby). Consequently, a user can easily recognize information such as the number of the inputted jobs and statuses thereof, thereby solving a problems such that a user is confused by the presence of the inputted jobs which are not processed soon.

Furthermore, in order to avoid a situation in which all of the numerous jobs inputted cannot be checked in the display device 52, a scroll key 64 is provided on the right hand side of the display device. When a user presses the scroll key, all the jobs out of frame are shifted and displayed. This enables a user, when simultaneously processing numerous jobs, to check information on all the jobs, without being limited to the size of the display window of the display device 52.

Figure 7:
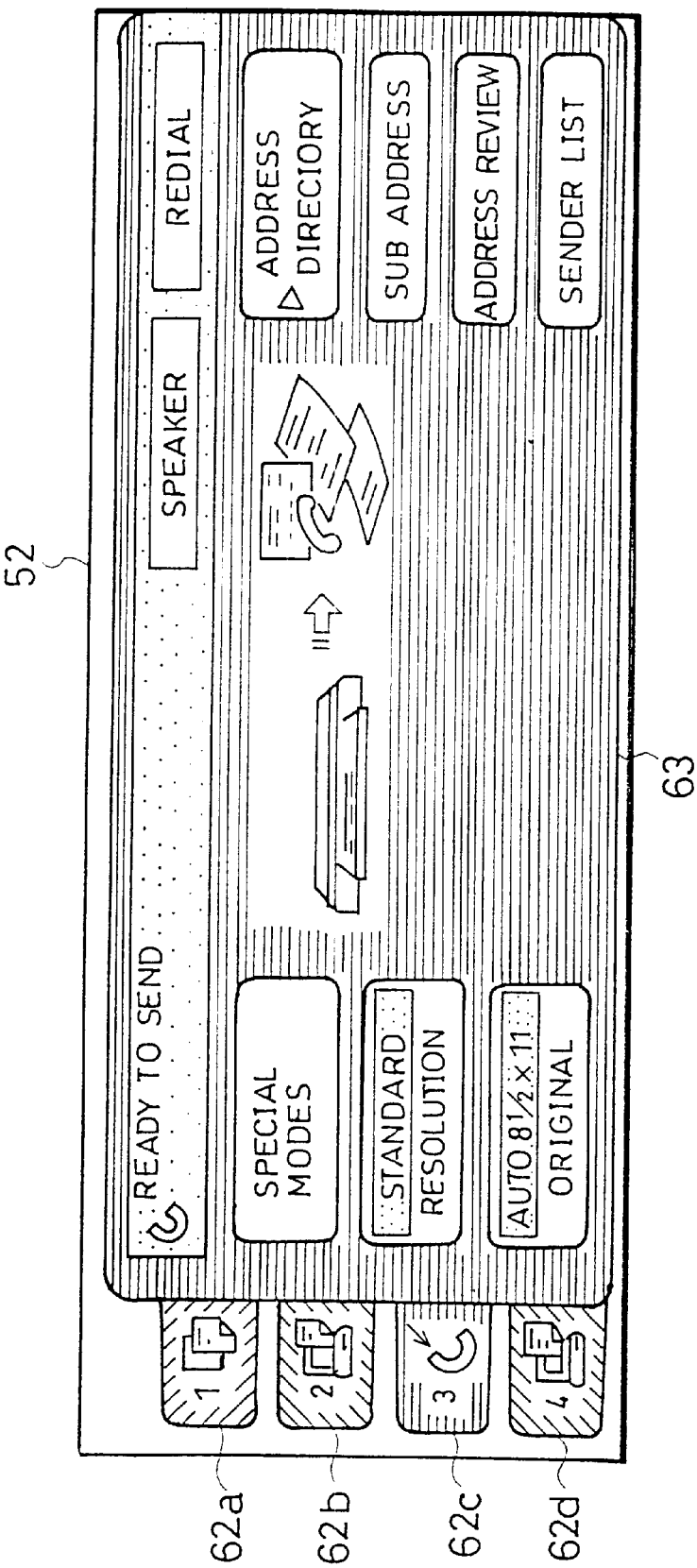
FIG. 7 is an explanatory drawing showing still another display example of the display device.
Figure 8A:
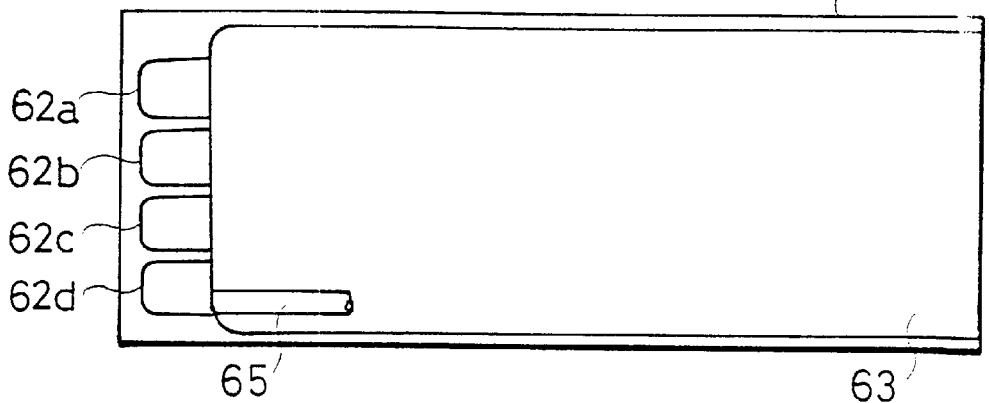
FIG. 8(a) to 8(c) are explanatory drawings showing display operations of yet another display example of the display device.
Figure 8B:
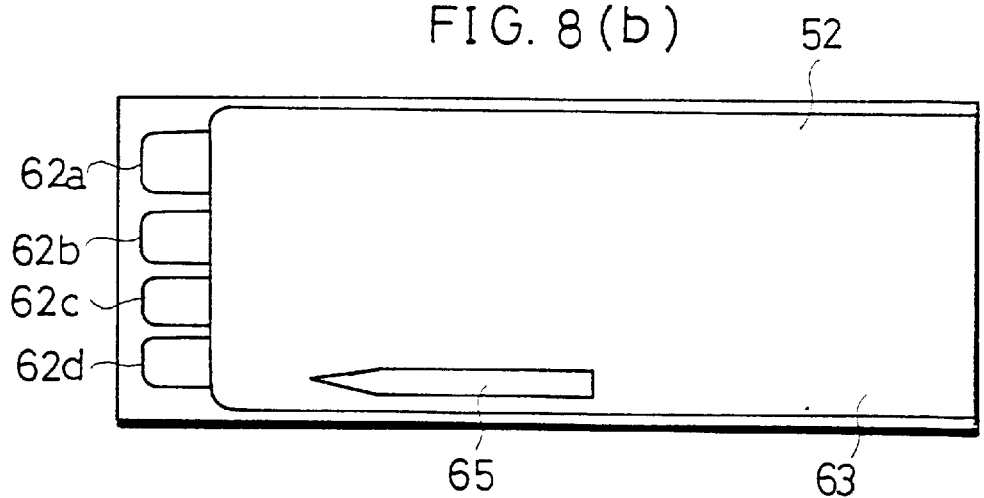
Figure 8C:
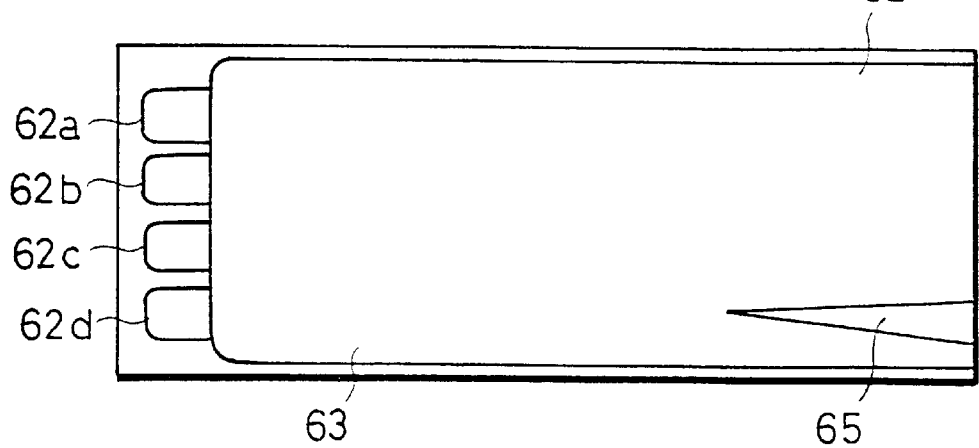

FIG. 7 shows a state of a job sending instruction window for inputting instructions on the fax mode as a new job. When inputting, information on a processing mode for the inputted job is largely displayed on the display device 52 in a color corresponding to the processing mode. Note that, when programming for a new job to be sent while receiving a newer job via the image data communications unit 47, an icon corresponding to the received job is displayed in the background of the sending job instruction window.

As discussed, the control panel 45 according to the present embodiment has an arrangement in which, display colors each of which corresponds to a different processing mode are used to display the setting window 63 for a new job, the icon 62a showing information on the job simultaneously processed, the icons 62b and 62c of the setting windows for standby jobs, and the icon 62d showing information on the newly inputted job, simultaneously in the display device 52. Accordingly, this allows a user to easily check information as to what processing mode is currently processed, and also, to simultaneously check information such as processing modes for standby jobs, and the presence of the newly inputted jobs and even the number thereof.

Further, the respective display colors of the mode selection keys 57 through 59 are set to correspond to the display colors respectively representing the processing modes displayed in the display device 52, while disposing them in a vicinity, thereby enabling a user to simultaneously check the colors of the mode selection keys 57 through 59 and the color of information displayed on the display device 52, thus allowing a user to easily check the operational state of the device without largely shifting a line of sight in a vicinity of a display in the control panel.

Furthermore, information on a major processing is displayed in a large area of the setting window 63, which overlaps display of information on standby jobs, thereby concealing information on details (processing modes, date and time, status, etc.) of the jobs. Thus, by overlapping information on standby jobs with other information on details of the processing modes, only the types of standby jobs can be clearly made distinctive according to a difference in hues, thereby allowing a user to carry out various judgments easily.

Note that, in order to draw a user's attention with respect to a newly inputted job or a standby job, the icons 62a, 62b, 62c and 62d displayed in the vicinity of the setting window 63 in the display device 52 may be partially or entirely flashed.

Furthermore, apart from the method of drawing the user's attention by partially or entirely flashing the icons 62a, 62b, 62c and 62d, it is also possible to display as shown in FIGS. 8(a) through 8(d) when receiving a new job so as to notifying a user that the new job has been inputted and what mode is adopted in the inputted job.

For example, it may also be arranged in such a manner that, when receiving a new job while the display device 52 displays information on a certain job, a display block 65, which corresponds to the inputted information shown in a display color representing a mode adopted in the new job, moves in the sequence from FIG. 8(a) to FIG. 8(d), that is, from the left to the right along the downside of the screen of the display device 52, thereby notifying a user of receipt of a new job and the content thereof intelligibly and in a manner that draws the user's attention.

As discussed, the display device 52 according to the present embodiment has different display colors for information depending on what processing mode is adopted, thereby enabling a user to promptly and properly check and recognize information on a processing mode by simply looking at a color displayed on the multi-color display means.

Further, even during process by the first processing mode, when receiving an instruction (job) to carry out another processing mode, the multi-color display means can display it in a color representing a processing mode adopted in the job, thereby enabling a user to check as to what processing mode is adopted in the inputted job.

Further, by determining a display color for each processing mode, a user can judge the processing mode of the inputted job at a glance, thereby enabling a user to readily check the operational status of a device even when the device is arranged to simultaneously process a plurality of the inputted jobs.

Furthermore, in accordance with the present invention, since the processing mode selection means that are distinguished from one another by colors representing the respective processing modes are provided in the vicinity of the multi-color display means, it is possible to check the color of the processing mode selection means and the display color of the processing mode for each job displayed on the multi-color display means simultaneously (without largely shifting a line of sight). Accordingly, information on a processing mode displayed on the multi-color display means can properly be judged, and even when using the device capable of simultaneously processing a plurality of inputted jobs, a user can promptly and readily check the operational status of the device.

Further, according to the present invention, information on a processing mode displayed largely on the multi-color display means relates to a processing mode which is mainly operated by the device, and therefore, a user can readily check the processing mode adopted in a job which is currently in process while simultaneously checking the presence of other standby jobs, thus enabling-a user to readily check the processing mode for the job currently in process while paying attention to other jobs to be processed simultaneously.

Furthermore, according to the present invention, by overlapping information on a processing mode adopted in the job that is currently in process and information on processing modes adopted in standby jobs, each processing mode can be promptly checked based on a difference in hues. When information on the processing modes adopted in the standby jobs is displayed apart from the information on the processing mode currently in process, it is difficult for a user to check information on a processing mode adopted in an inputted new job. However, by thus overlapping displays, even when the information on the processing mode adopted in the job currently in process occupies a large area in display, a user can properly grasp the presence of standby jobs, thereby also properly checking information on processing modes adopted in standby jobs or a job which has been newly inputted.

SECOND EMBODIMENT

The following will explain another embodiment of the present invention with reference to drawings. For ease of explanation, structures having the same functions as those shown in the drawings pertaining to the first embodiment above will be given the same reference symbols, and explanation thereof will be omitted here.

In the present embodiment, as in the first embodiment, as electronic equipment according to the present invention, arrangements for an image forming apparatus (combined machine) including processing modes such as a copying mode, a printer mode and a fax mode will be explained; however, the present invention is not limited thereto. For example, an image forming apparatus may include either at least two of the foregoing three processing modes or other processing modes. Further, as electronic equipment, other electronic equipment having a plurality of processing modes other than the foregoing combined machine may be adopted in the same manner.

The digital image forming apparatus according to the present embodiment, in the First Embodiment, has the same structure as that of the digital copier 10 that was explained with reference to FIG. 1. Accordingly, explanation of the structure of the digital copier 10 will be omitted here.

Also, the structure and functions of an image processor which performs image processing on image information of a read-out original document are the same as those of the image processor explained with reference to FIG. 2 in the First Embodiment, thereby omitting explanation thereof.

Also, explanation that the operation of components of the whole digital copier 10 is controlled by the central processing unit 44 will also be omitted because the explanation thereof made with reference to FIG. 3 in the First Embodiment applies here.

(A First Embodiment of the Control Panel)

Figure 9:
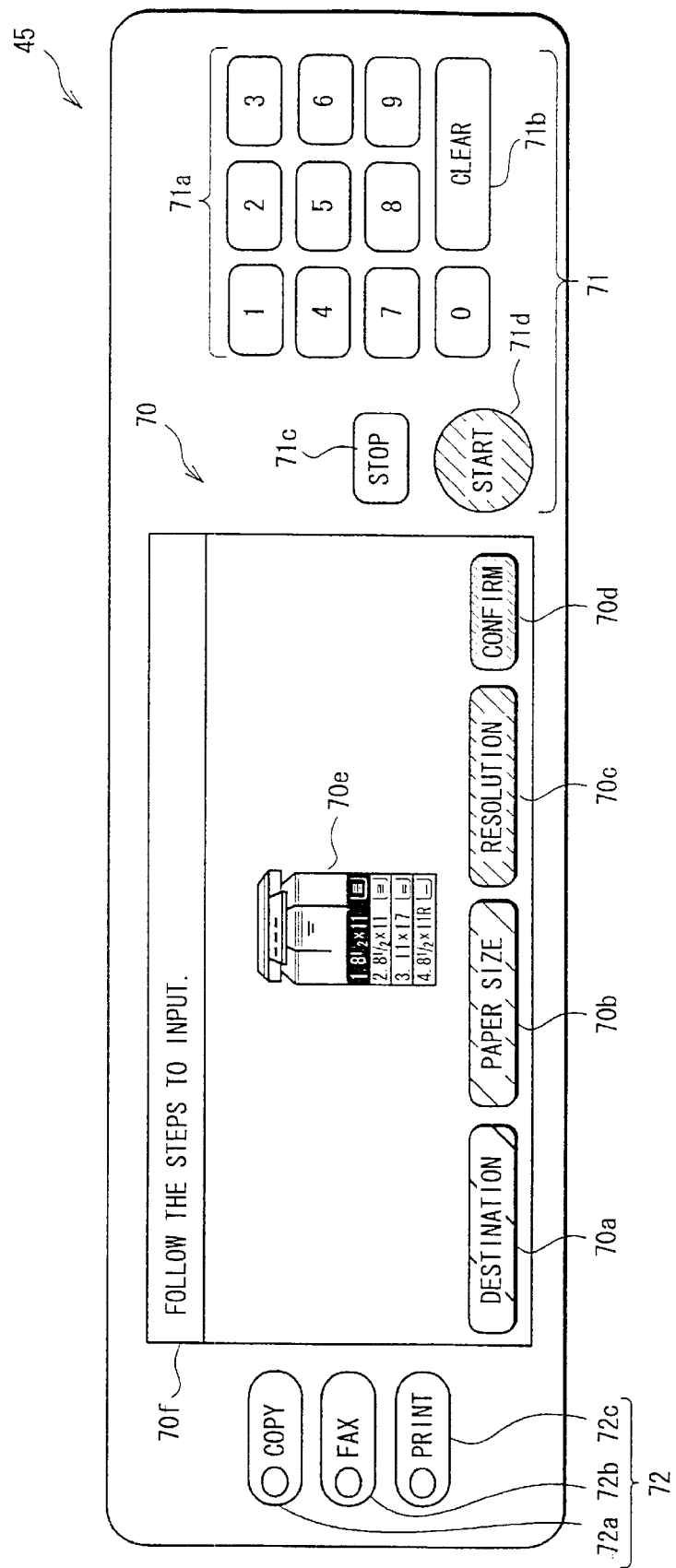
FIG. 9 is an explanatory drawing schematically showing an external outline of a control panel in a digital copier according to another embodiment of the present invention.

Next, a First Embodiment of the control panel 45 of the present embodiment will be explained. FIG. 9 is an explanatory drawing showing an external outline of the control panel 45. In the control panel shown in FIG. 9 is provided a touch panel type display 70 which will be described later. Note that, in the following embodiment, as a desirable embodiment, the display 70 as the touch panel type display will be explained, but the display 70 is not limited thereto, and another type of a display may be adopted instead.

As shown in FIG. 9, the control panel 45 (control device) according to the present embodiment has a substantially rectangular shape. In addition, in the substantial center of the control panel 45 is provided the touch panel type display 70 that serves as both a display means and a control means. Further, in FIG. 9, on the right hand side of the display 70 is provided a condition setting key group 71, and on the left hand side of the display 70 is provided a mode selection key group 72 which serves as processing mode selection means.

For more in details, first, in the display 70 are provided a destination key 70a for specifying a destination of transmittance, a paper size key 70b for specifying the size of a document, a resolution key 70c for specifying resolution, a confirmation key 70d for specifying conditions for selection, a device image 70e showing a relationship between an appearance of a device and components such as feeders 31 to 33, and a comment display section 70f for giving a user guidance by displaying comments on operating directions. Here, the destination key 70a, the paper size key 70b and the resolution key 70c make up the item selection mean according to the present invention.

Further, in the condition setting key group 71 are provided a ten-key numerical keypad 71a for inputting a print count, a clear key 71b for clearing data such as input of the ten-key numerical keypad 71a, a stop key 71c for demanding operations such as stopping the device, and a start key 71d for starting operations such as copying and faxing. Here, the start key 71d makes up the execution instructing means according to the present invention.

Further, in the mode selection key group 72 are provided a copying mode key 72a to be pressed when carrying out the copying mode in the device, a fax mode key 72b to be pressed when carrying out the fax mode, and a printer mode key 72c to be pressed when carrying out the printer mode.

Note that, in the present invention, the form of the control panel 45, the disposition of components such as controllers (the condition setting key group 71 and the mode selection key group 72), the number of the keys are not particularly limited. However, in order to enable a user to continuously carry out the operating steps in an operation of the device, it is preferable that the keys are sequentially provided, for example, from the left to the right. In the present embodiment, the keys such as the condition setting key group 71 and the mode selection key group 72, and the display 70 are disposed so as to control the keys from the left hand side of the control panel 45 to the right hand side thereof, the disposition is not limited thereto. Namely, in accordance with either the form of the device or a user's preference, the keys, for example, may be disposed from the right to the left, or from the top to the bottom.

Further, in the present embodiment, as described, the display 70 is a touch panel capable of color display, and the display 70 includes display of the keys 70*a* through 70*d*. A plurality of keys which are displayed on the display 70 are, as shown in FIG. 9, disposed linearly from the left to the right, and the display color of each key is arranged to vary sequentially.

For example, assuming that the fax mode key 72*b* is selected from the mode selection key group 72, the display 70 displays keys for setting various conditions to carry out the fax mode. Namely, as shown in FIG. 9, the display 70 displays the destination key 70*a* for specifying the destination of transmittance, the paper size key 70*b* for specifying the size of a document, the resolution key 70*c* for specifying the resolution, and the confirmation key 70*d* for confirming all the above settings after finally checking them, in this order, sequentially in line from the left to the right.

Note that, as to the display position of the keys displayed on the display 70 (hereinafter collectively referred to as "display keys"), the display keys are disposed so as to be aligned in a substantially linear form with respect to the start key 71*d* included in the condition setting key group 71. In addition, a color shade (hue) of each display key varies sequentially from the left to the right.

More specifically, for example, the destination key 70*a*, the paper size key 70*b*, the resolution key 70*c* and the confirmation key 70*d* are respectively displayed in purple, violet, blue and bluish green. In addition, the start key 71*d* that is disposed in a substantially linear form together with the display keys is displayed in green. Thus, it is arranged such that hues of the display colors vary sequentially from the destination key 70*a*, that is the first setting condition, to the start key 71*d* for finally carrying out the fax mode, as follows: purple, violet, blue, bluish green, and green.

Next, the following will explain an example of an operation for carrying out the fax mode by the control panel 45 having the foregoing configuration, with reference to drawings. First, when the fax mode key 72*b* out of the mode selection key group 72 is selected (pressed), as shown in FIG. 9, in the display 70, a plurality of display keys 70*a* to 70*d* for setting conditions are displayed in such a position as to be aligned in a substantially linear form, for example, along the downside of the display 70. In that case, setting items include a destination of transmittance, the size of a document, resolution.

As discussed, the types of the display keys are four in total, which are the destination key 70*a*, the paper size key 70*b*, the resolution key 70*c* and the confirmation key 70*d*. In addition, above the display keys is displayed a current schematic diagram of the digital image forming apparatus 10 (device image 70*e*). In the further above, in an upper end of the display 70 is provided the comment display section 70*f* which displays a message ("Follow the steps to input" is an example in FIG. 9) for giving support to a user in the operation of the device.

Next, the destination key 70*a* which is the display key to specify the first condition is selected (pressed) first. The destination key 70*a* is disposed on the left end of the display 70, and also, it has a display color (display color: purple) having a most different hue from that of the start key 71*d* (display color: green). Namely, it is arranged to easily grasp that the destination key 70*a* be selected first after selecting the fax mode key 72*b*. When the destination key 70*a* is selected, as shown in FIG. 10, instead of previous display of the device image 70*e* is displayed a frame containing a destination specifying key group 70*g* for selecting a previously registered destination, which includes display of destination specifying keys representing respective registered addresses.

Figure 10:
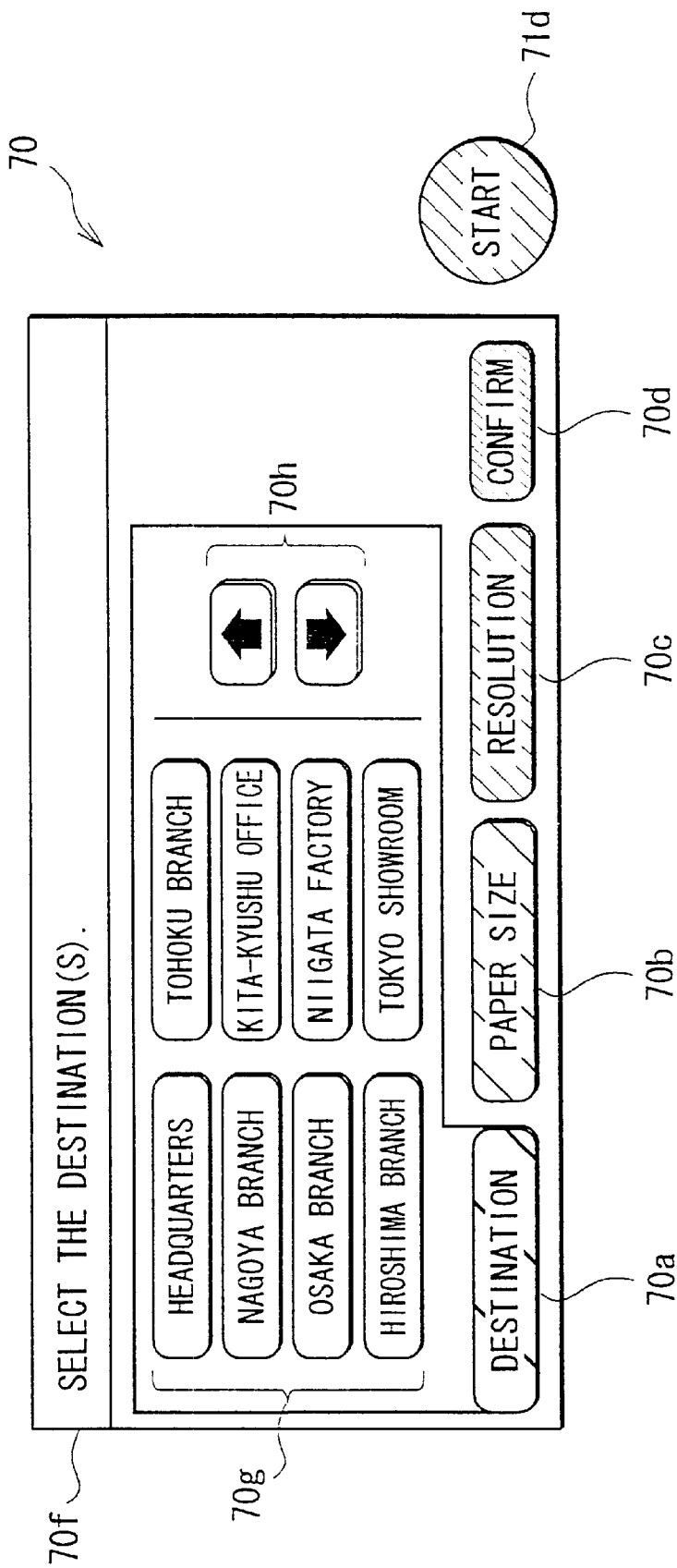
FIG. 10 is an explanatory drawing showing a display example of a display section and a start key in the control panel.

In an example of display shown in FIG. 10, the destination specifying keys representing destinations such as 'headquarters', 'branches', 'factories' and 'showrooms' are displayed. In addition, taking into consideration a possible incapacity of the display 70 to simultaneously display all the destination specifying keys within a frame, for example, on the right edge of the display 70 is additionally displayed a scroll key group 70*h* for scrolling display of the destination specifying key group 70*g*. Further, the comment display section 70*f* displays a message such as "select the destination(s)", thereby enabling a user. to select a destination of fax transmission. Here, the destination specifying keys representing the destination of transmission such as 'headquarters', 'branches', 'factories' and 'showrooms' make up the subordinate item selection means according to the present invention, and each item itself corresponds to a subordinate selection item (subordinate item).

Next, the paper size key 70*b* disposed adjacent to the right hand side of the destination key 70*a* is selected (pressed). The paper size key 70*a* is displayed in violet which has a hue slightly more similar to green than purple used as the display color of the destination key 70*a*. Thus, the foregoing arrangement helps a user understand that the paper size key 70*b* be preferably selected after setting with the destination key 70*a*. When the paper size key 70*b* is selected, as shown in FIG. 11, a paper size specifying key group 70*i* including paper size specifying keys respectively representing various paper sizes for selection of a document size is displayed.

Figure 11:
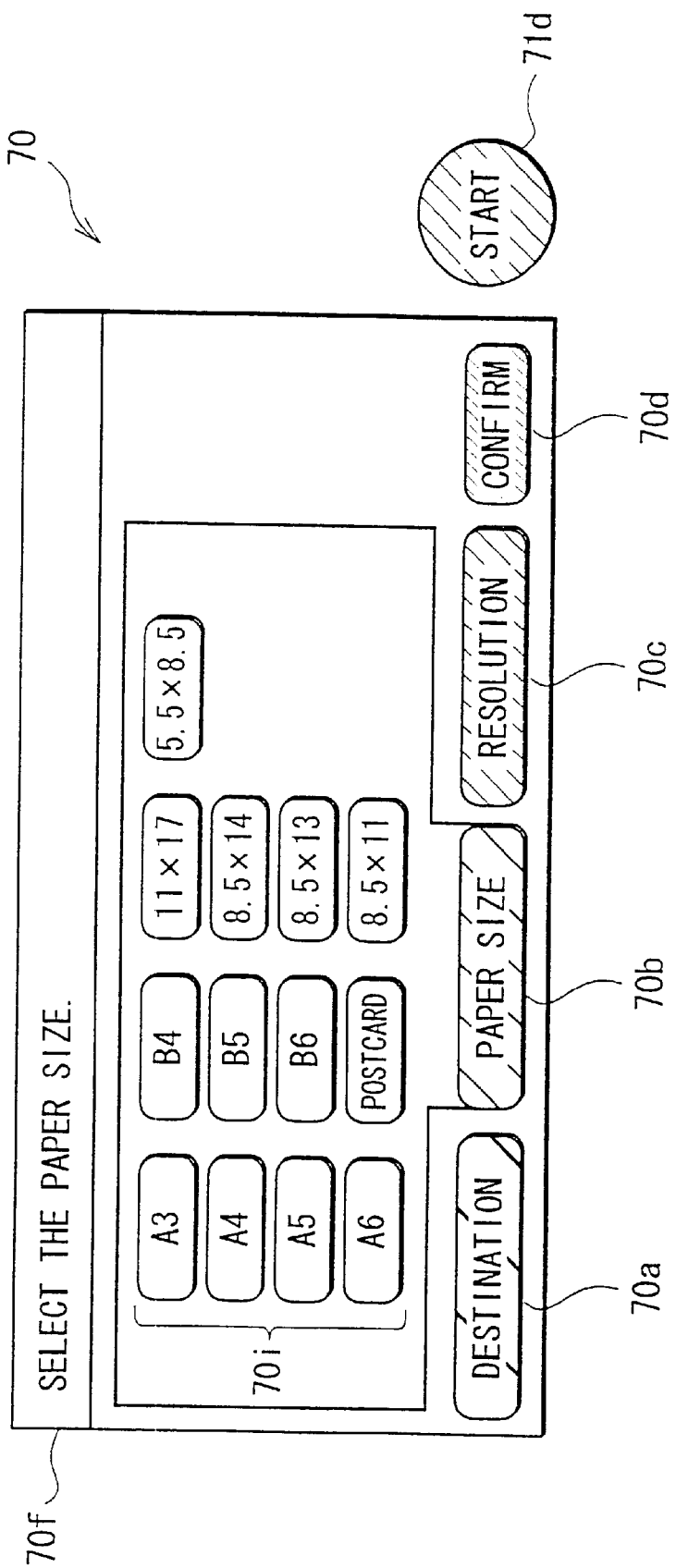
FIG. 11 is an explanatory drawing showing another display example of the display section and the start key in the control panel.

In an example shown in FIG. 11 are displayed paper size specifying keys respectively corresponding to A3 to A6, and B4 to B6, which are paper sizes of the AB series of paper (the inch series of paper may also be adopted), a normalized paper size such as a 'postcard' size, and a paper size other than the foregoing standards but frequently used (displayed as a vertical size×a horizontal size). Here, the paper size specifying keys representing the paper sizes such as 'A3', 'A4', 'A5' and 'A6' correspond to the subordinate item selection means according to the present invention, and each item itself corresponds to a subordinate item.

Further, the comment display section 70*f* displays a message such as "select the paper size", thereby enabling a user to select the paper size of an original document to be read out. Note that, the scroll key group may be optionally provided as with the destination specifying key group, depending on the size of a frame.

Next, the resolution key 70*c* disposed adjacent to the right hand side of the paper size key 70*b* is selected (pressed). The resolution key 70*c* is displayed in blue which has a hue slightly more similar to green than violet used as the display color of the paper size key 70*b*, thereby helping a user understand that the resolution key 70*c* be preferably selected after setting with the paper size key 70*b*.

Figure 12:
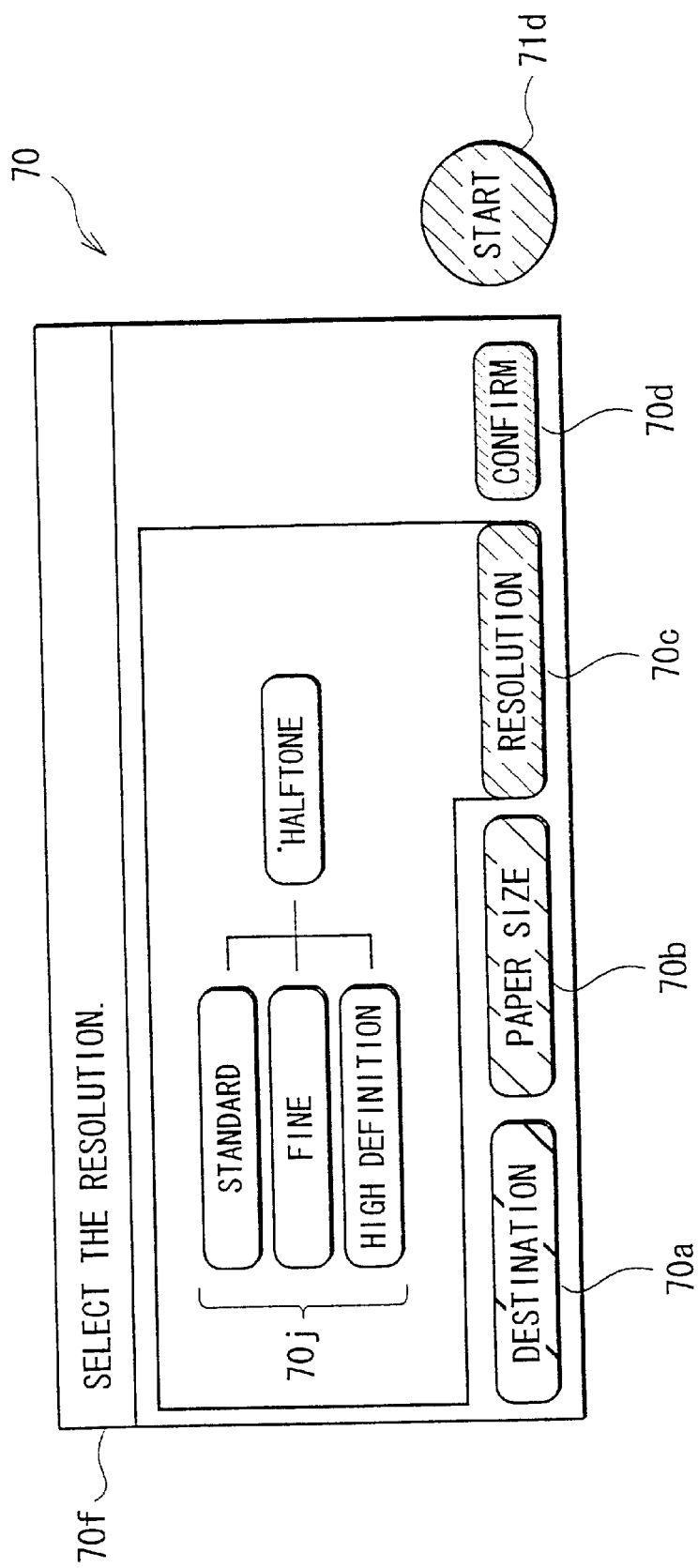
FIG. 12 is an explanatory drawing showing yet another display example of the display section and the start key in the control panel.

When the resolution key is selected, as shown in FIG. 12, resolution specifying key group 70*j* including resolution specifying keys each of which represents each level of resolution for setting resolution is displayed. In an example shown in FIG. 12 are displayed resolution specifying keys such as 'standard', 'fine', 'high definition' and 'halftone'. In addition, the comment display section 70*f* displays a message such as "select the resolution", thereby enabling a user to select resolution to be applied when reading out an original document. Here, the resolution specifying keys representing the resolution such as 'standard', 'fine', 'high definition' and 'halftone' correspond to the subordinate item selection means according to the present invention, and each item itself corresponds to a subordinate item.

Next, the confirmation key 70d disposed adjacent to the right hand side of the resolution key 70c is selected (pressed). The confirmation key 70d is displayed in bluish green which has a hue slightly more similar to green than blue used as the display color of the resolution key 70c, thereby helping a user understand that the confirmation key 70d be preferably selected after setting with the resolution key 70c.

Figure 13:
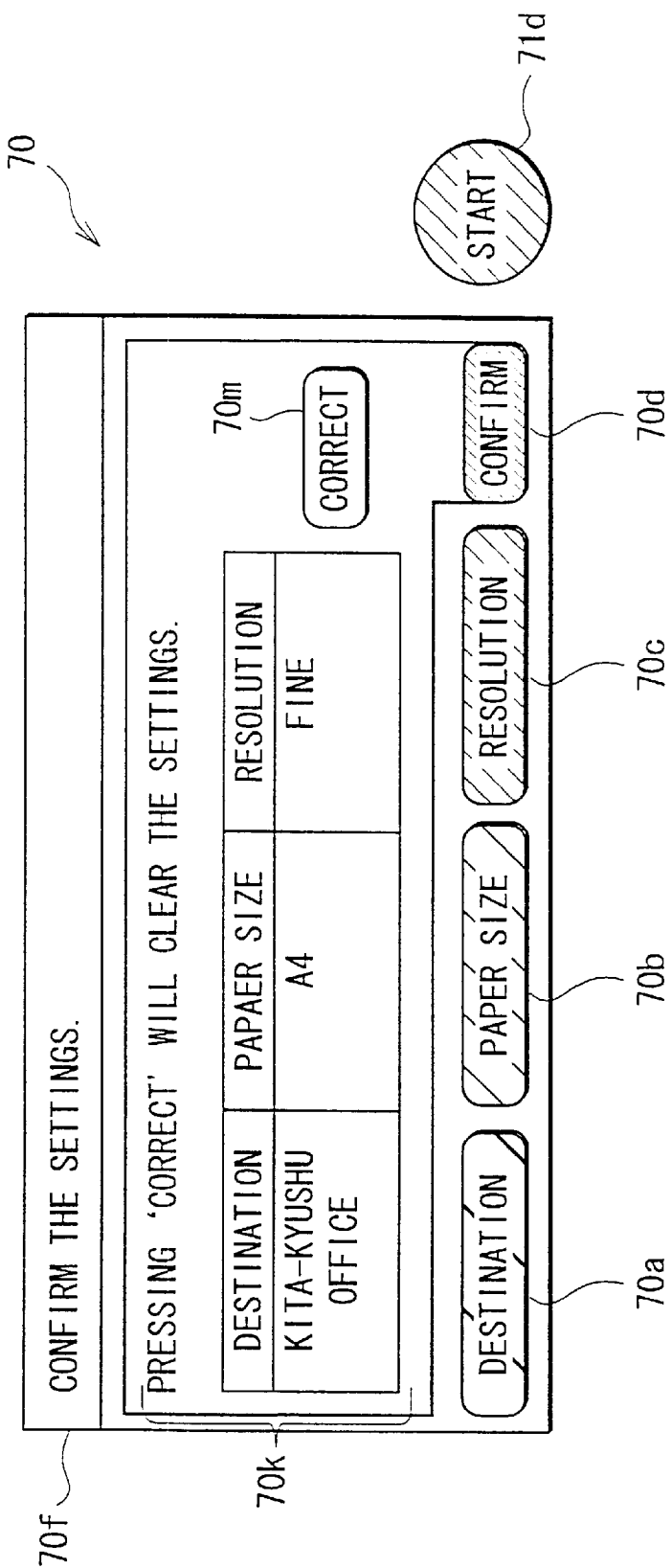
FIG. 13 is an explanatory drawing showing still another display example of the display section and the start key in the control panel.

When the confirmation key 70c is selected, as shown in FIG. 13, all the conditions set hitherto are made into a list, which is displayed in a selection contents display section 70k. It is shown in an example of FIG. 13 that 'Kitakyushu Office' as the 'destination', 'A4' as the 'paper size', 'fine' as the 'resolution' are set, respectively.

Further, in the present embodiment, a correction key 70m for allowing selected conditions to be corrected is displayed on the right hand side of the selection contents display section 70k. In addition, the comment display section 70f displays a message such as "confirm the settings", while displaying a message such as "Pressing 'correct' will clear the settings" along an upper side of the selection contents display section 70k, thereby enabling a user to confirm setting contents, and correct the setting contents as required.

In the end, selecting (pressing) the start key 71d displayed in green causes image information which was read out of an original document having the paper size of 'A4' to be transmitted as a fax with 'fine' resolution with respect to 'Kitakyushu Office'.

As explained, the control panel 45 of the present embodiment has the features including: ① the keys for setting conditions are sequentially aligned in one direction; ② display colors (hues) of the keys vary sequentially; and ③ messages for giving support to a user in setting conditions are displayed. This makes it visually clearer that conditions are set in a predetermined sequence, thereby enabling a user to set various conditions for electronic equipment such as a combined machine more easily and surely.

Note that, in the foregoing embodiment, operations in relation to the fax mode have been explained, but the same variation in hues of the display colors of display keys as in the above fax mode can also be applied when switching modes to the copying mode or the printer mode. Accordingly, even when changing a mode, only the same operations are required in accordance with a variation in hues, thereby not requiring a user to memorize details such as a dedicated operation in an individual processing mode, the name of each setting item and a sequence, thus readily operating multi-function electronic equipment surely and promptly.

Note that, in the present invention, a way in which hues in the display of keys vary is not particularly limited, but a degree of variation in hues may be changed in accordance with a display color commonly used and the number of keys to be displayed. That is, even when the number of setting items varies in each of the printer mode and the copying mode, or when setting items for each mode vary in accordance with a model, it is simply needed that a degree of variation in hues be changed.

Further, in the present embodiment, since the start key 71d is displayed in green, explanation has been made through an example in which green is used as a display color to notifying the completion of operations, but selection of a hue can be appropriately made in accordance with conditions such as a model of the device and operating directions. For example, as in the above example, when green is the color for notifying the completion of operations, a color having an apparently different hue from green, i.e., purple is preferably used as a display color for a key to carry out the first operation. Thus, by largely changing a hue in the display color of keys for operations from the beginning to the end, a plurality of colors can be adopted throughout the whole operating process. Namely, even when it is necessary to arrange more detailed settings than usual in accordance with numerous conditions, hues in the display colors of keys respectively representing the conditions can vary clearly.

More specifically, as a way in which hues vary, not only the foregoing variation of purple, violet, blue, bluish green and green, but also a variation of red, orange (reddish yellow), yellow, yellowish green and green may also be possible, provided that colors like red and yellow are used commonly as colors for warning, etc., (warning colors), and therefore, it is preferable that these colors are not used as display colors to represent common operational keys but in display for warning in the emergence of troubles or display requiring a user's clear attention thereto.

(A Second Embodiment of the Control Panel)

In the foregoing First Embodiment of the control panel, at a time when the fax mode is selected, the destination key 70a, the paper size key 70b, the resolution key 70c and the confirmation key 70d are all displayed in the display 70. In the present embodiment, however, the display 70 displays only keys required for setting. Note that, since the other display contents and operational procedures are the same as those explained in the First Embodiment, the same explanation will be omitted. In addition, components having the same functions as those explained in the First Embodiment will be given the same reference symbols.

Figure 14:
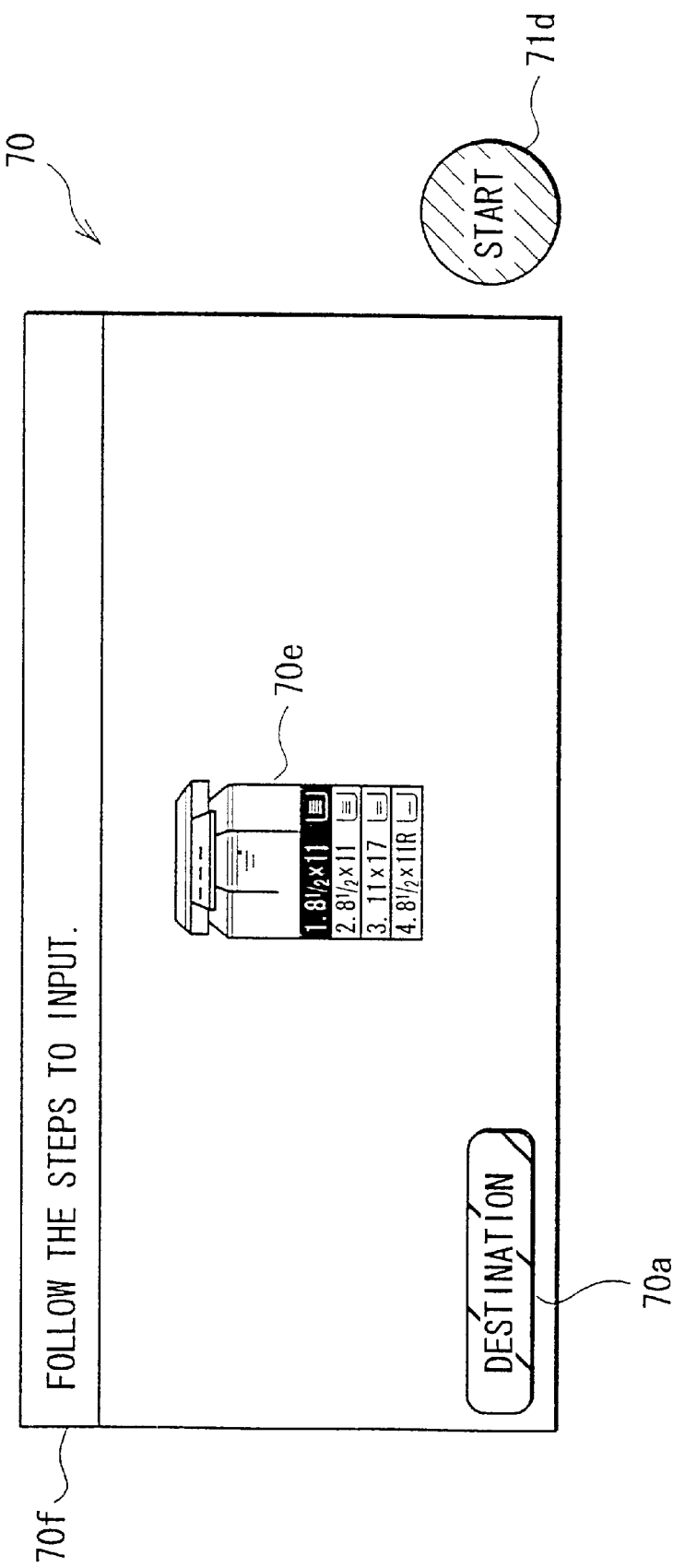
FIG. 14 is an explanatory drawing showing still another display example of the display section and the start key in the control panel.

First, when the fax mode key 72b is selected, as shown in FIG. 14, a destination key 70a, which is the key to display the first conditional settings, is displayed in purple on the left end of the downside of the display 70.

Figure 15:
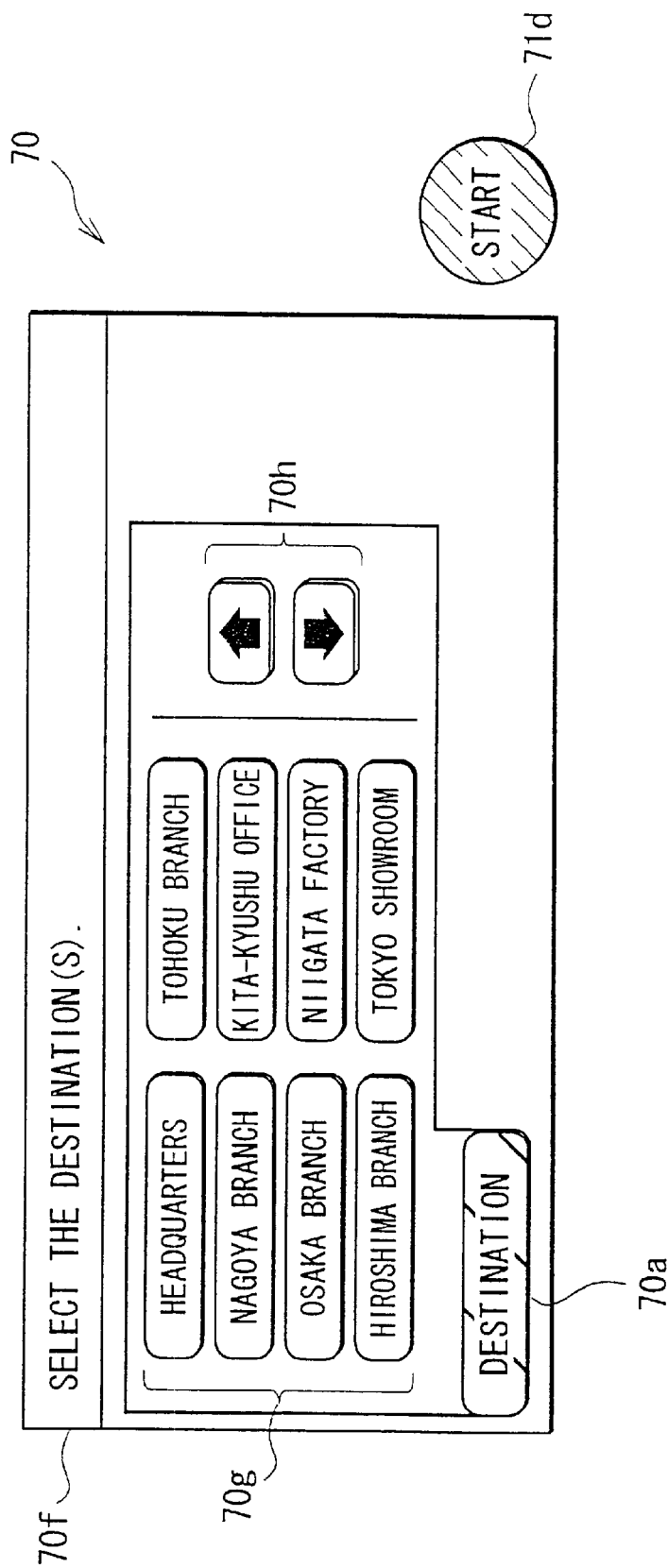
FIG. 15 is an explanatory drawing showing still another display example of the display section and the start key in the control panel.

Here, when the destination key 70a is selected, as shown in FIG. 15, the destination specifying key group 70g for setting a destination of transmittance, and the scroll key group 70h are displayed. In addition, the comment display section 70f displays a message such as "select the address (es)".

Figure 16:
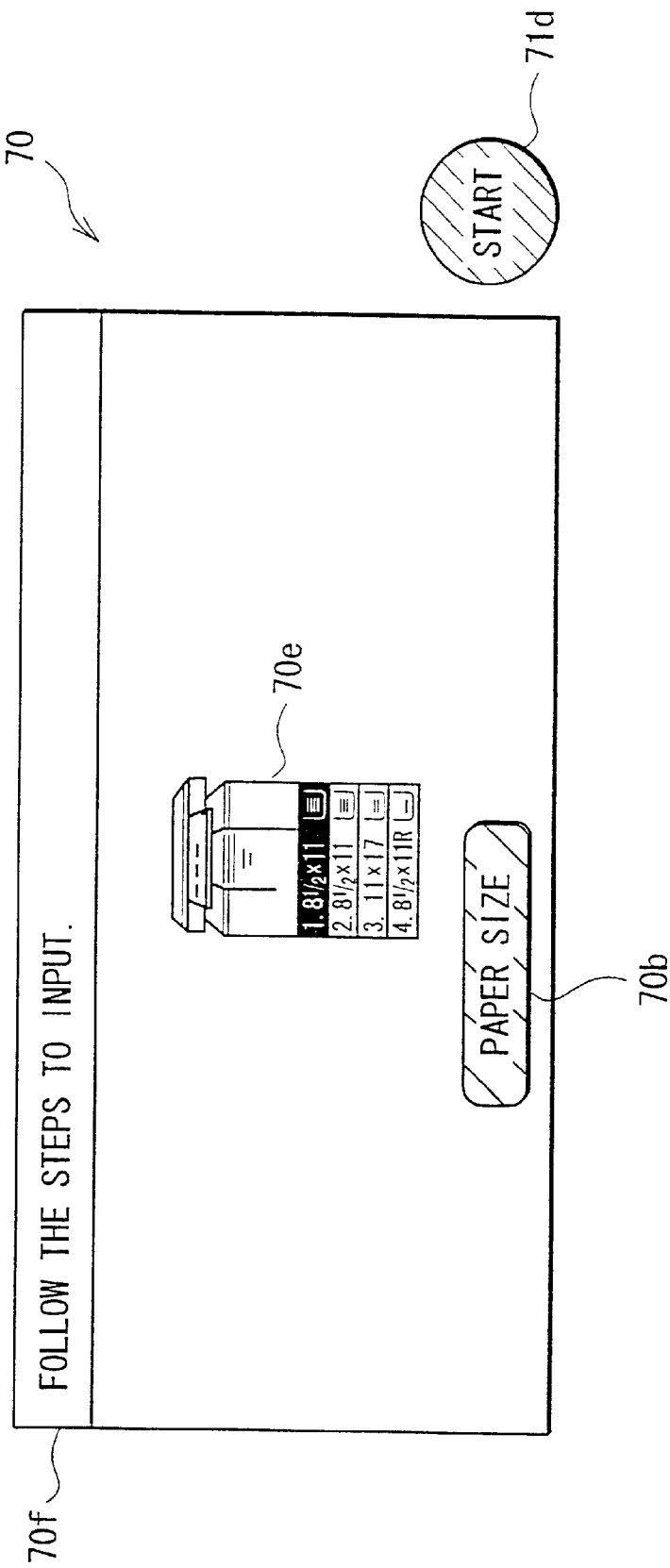
FIG. 16 is an explanatory drawing showing still another display example of the display section and the start key in the control panel.

When a user selects a destination specifying key out of the destination specifying key group 70g so as to complete the setting of the destination, as shown in FIG. 16, the display of the destination key group 70g and the destination key 70a disappears, then, the originally displayed device image 70e of a combined machine is displayed again, while displaying the paper size key 70b in violet in a position adjacent to the right hand side of the destination key 70a.

Figure 17:
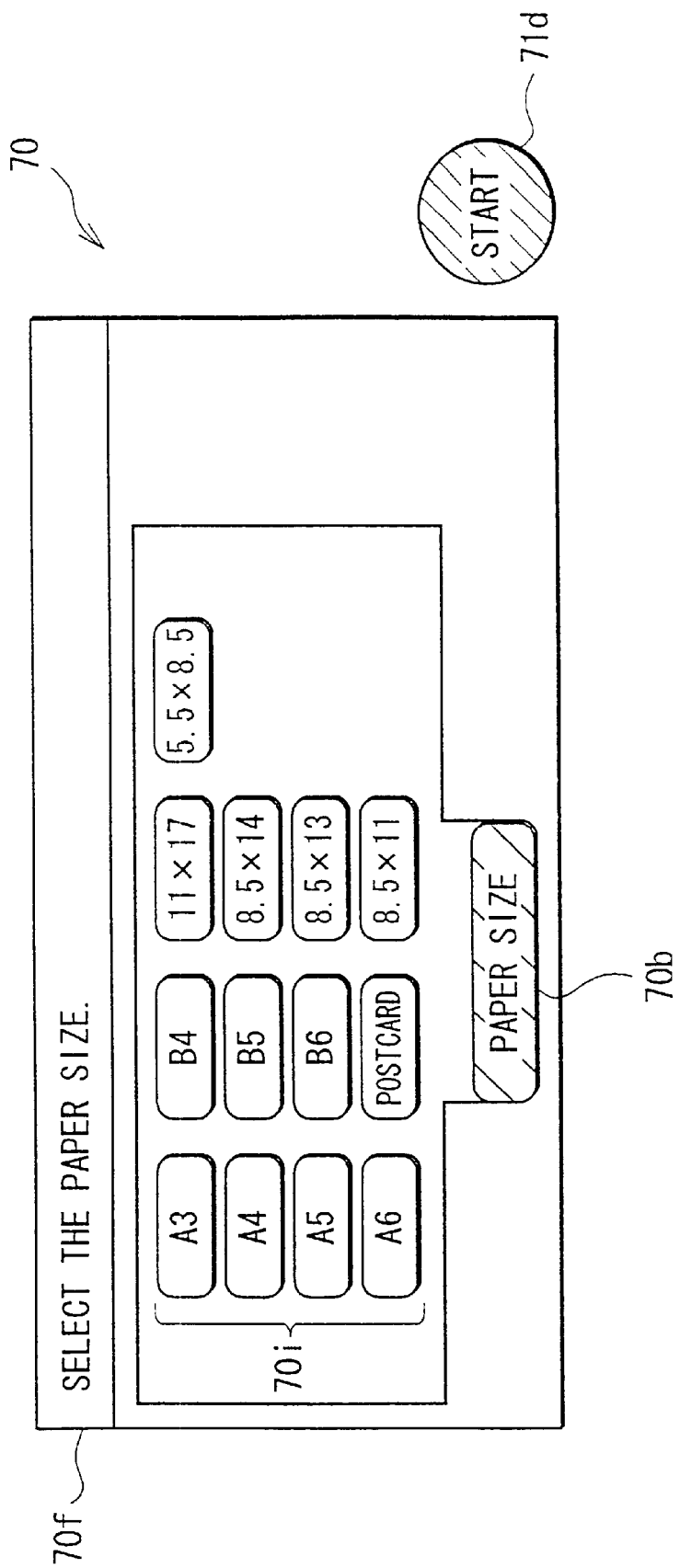
FIG. 17 is an explanatory drawing showing still another display example of the display section and the start key in the control panel.

Here, when the user presses the paper size key 70b, as shown in FIG. 17, the paper size specifying key group 70i is displayed. The paper size specifying key group 70i is made up of a plurality of paper size specifying keys respectively representing various paper sizes. When the user selects one of the paper size specifying keys which corresponds to the size of an original document, the paper size is set.

Figure 18:
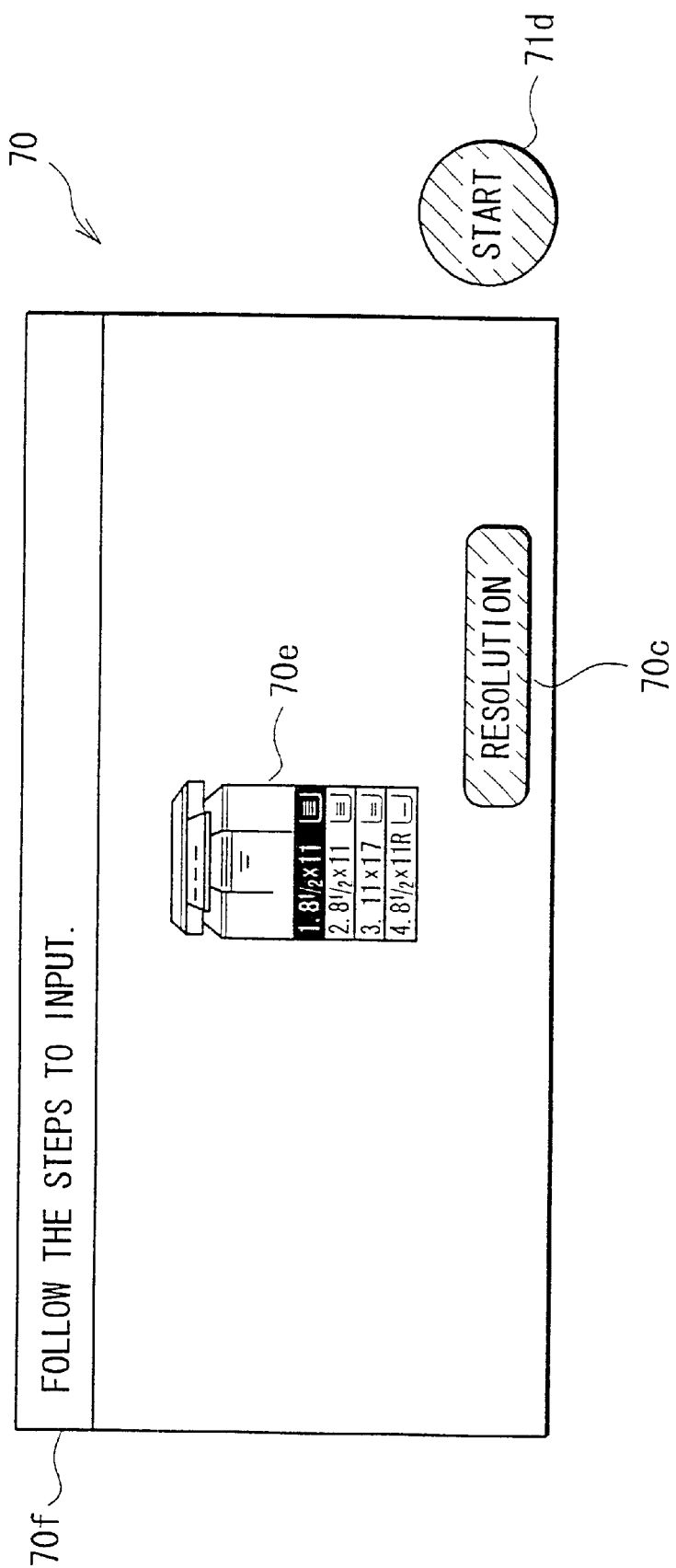
FIG. 18 is an explanatory drawing showing still another display example of the display section and the start key in the control panel.

When the paper size is set, as shown in FIG. 18, the display of the paper size specifying key group 70i and the paper size key 70b disappears, then, the device image 70e is displayed again, while displaying the resolution key 70c in blue adjacent to the right hand side of the paper size key 70b.

Figure 19:
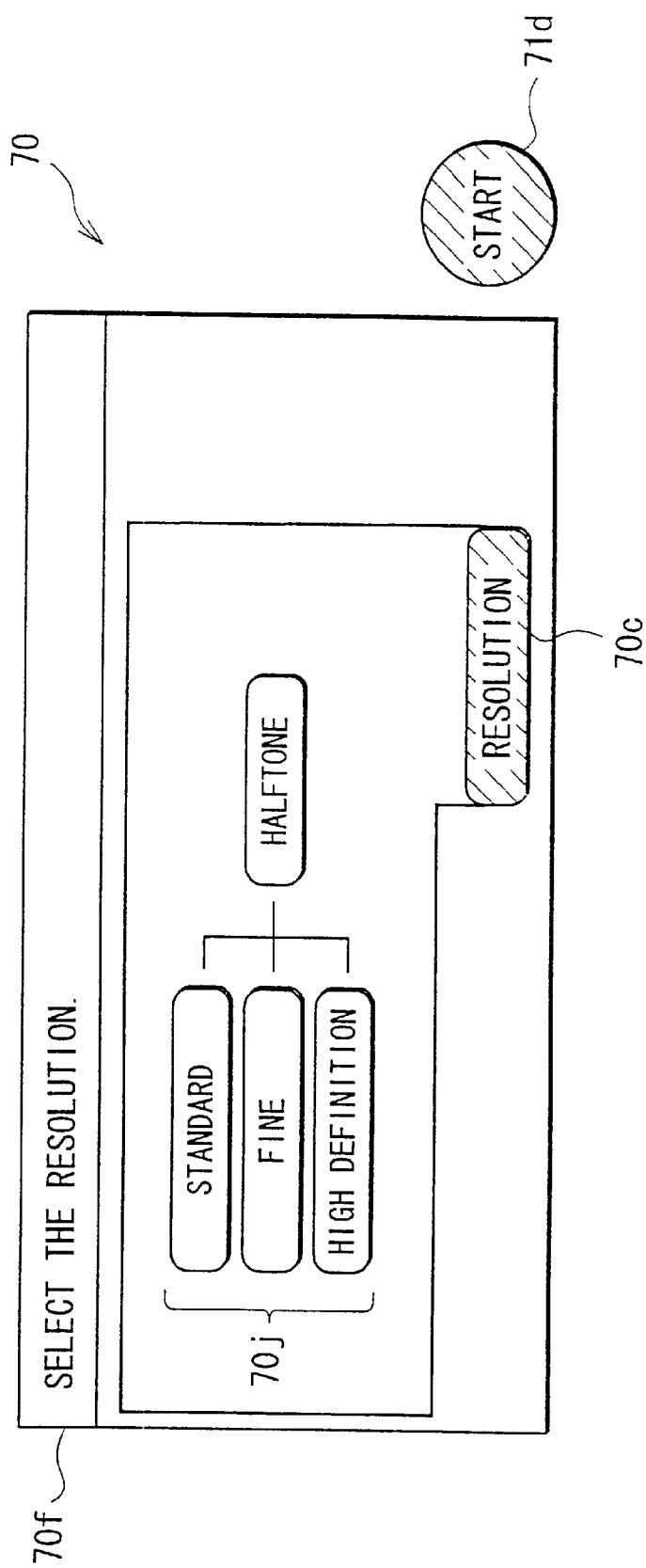
FIG. 19 is an explanatory drawing showing still another display example of the display section and the start key in the control panel.

Here, when the user presses the resolution key 70c, as shown in FIG. 19, the resolution specifying key group 70j is displayed. The resolution specifying key group 70j is made up of a plurality of resolution specifying keys respectively representing various levels of resolution. When the user selects one of the resolution specifying keys which corresponds to one level of resolution, the resolution is set.

Figure 20:
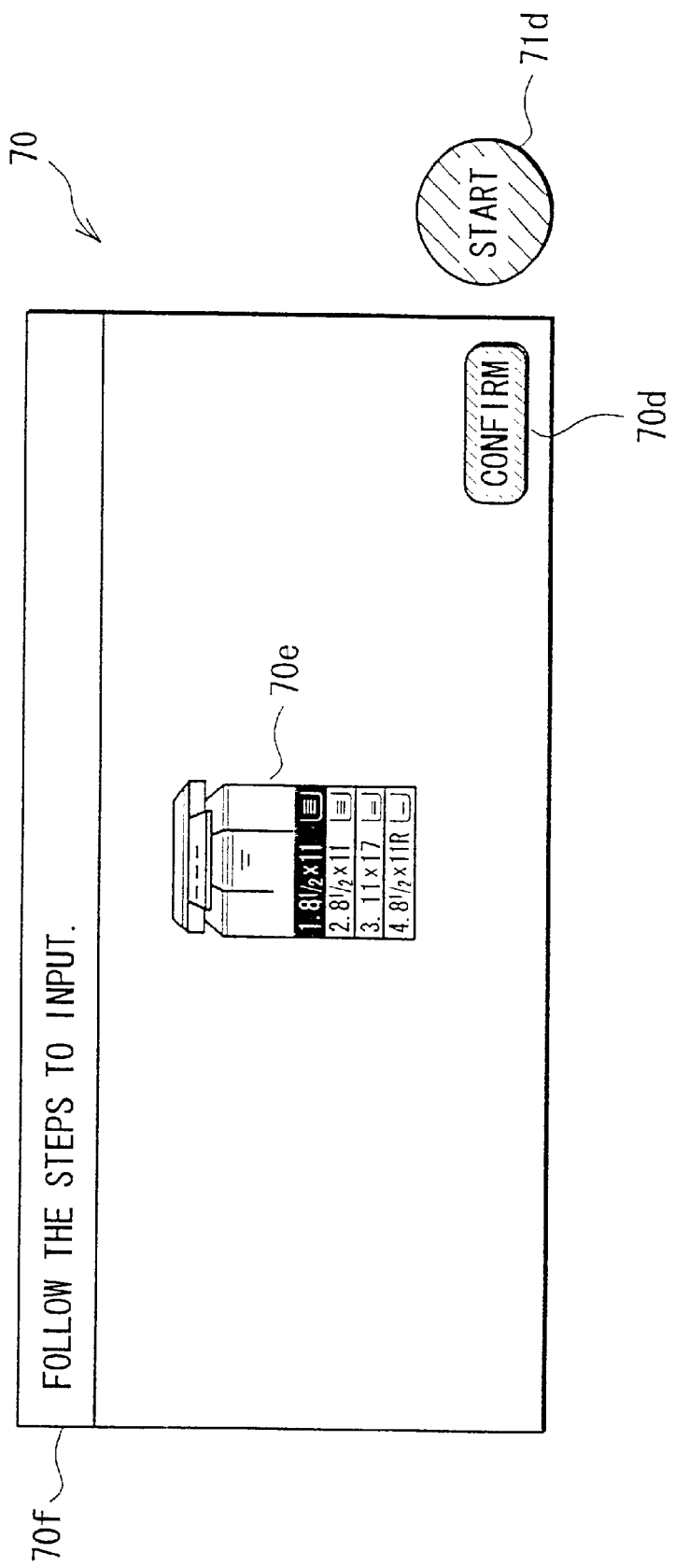
FIG. 20 is an explanatory drawing showing still another display example of the display section and the start key in the control panel.

When the resolution is set, as shown in FIG. 20, the display of the resolution specifying key group 70j and the resolution key 70c disappears, then, the device image 70e is displayed again, while displaying the confirmation key 70c in bluish green adjacent to the right hand side of the resolution key 70c.

Figure 21:
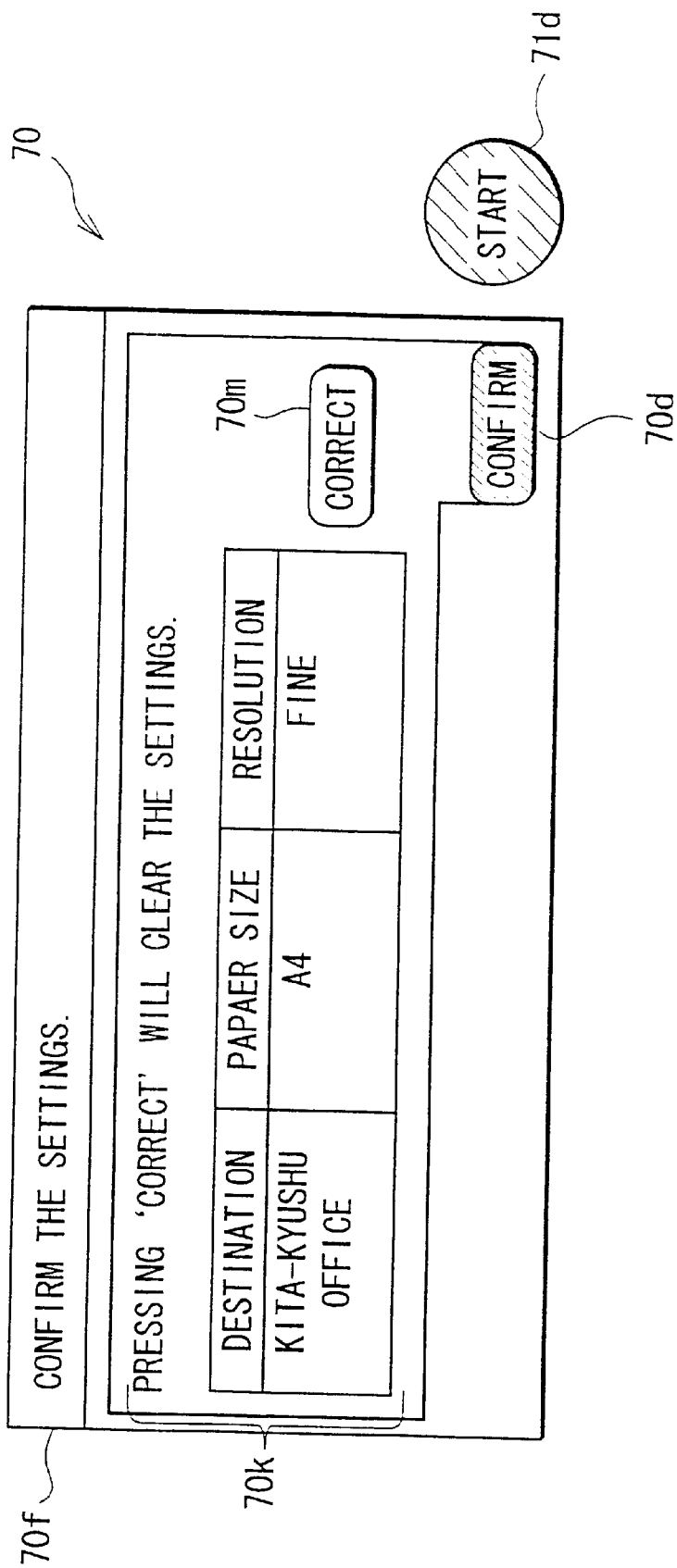
FIG. 21 is an explanatory drawing showing still another display example of the display section and the start key in the control panel.

Here, when the user presses the confirmation key 70d, as shown in FIG. 21, the selection contents display section 70k is displayed. The selection contents display section 70k displays a list of setting contents which have been set hitherto, and the correction key 70m for correcting the setting conditions. The user, after confirming the setting conditions, may correct the setting conditions by pressing the correction key 70m as required. In the end, by pressing the start key 71d which has the display color of green, fax transmission based on the setting conditions is carried out.

In the present Second Embodiment, the plurality of display keys described above are, as in the First Embodiment, disposed in such a position as to be aligned substantially in line with the start key 71d, where only the necessary keys to be displayed are displayed. Consequently, as is clear from FIGS. 14 through 21, it is arranged such that, viewing from the side of the mode selection key group 72 for an initial operation, the display position of a key to be displayed is gradually shifted toward the start key 71d for the final operation, thereby enabling a user to grasp to which stage of the whole operations, from the beginning to the end, a current conditional setting belongs.

(A Third Embodiment of the Control Panel)

In the present embodiment, as in the Second Embodiment, it is basically arranged such that only the keys to be displayed for setting necessary conditions are displayed; however, the key to be displayed corresponding to a condition, the setting of which is completed, does not disappear but remains on the display as it is. Note that, the other display contents and the operational procedures are the same as those explained in the First and Second Embodiments, and therefore, the same explanation will be omitted here. In addition, components having the same functions as those explained in the First and Second Embodiments will be given the same reference symbols.

Figure 22:
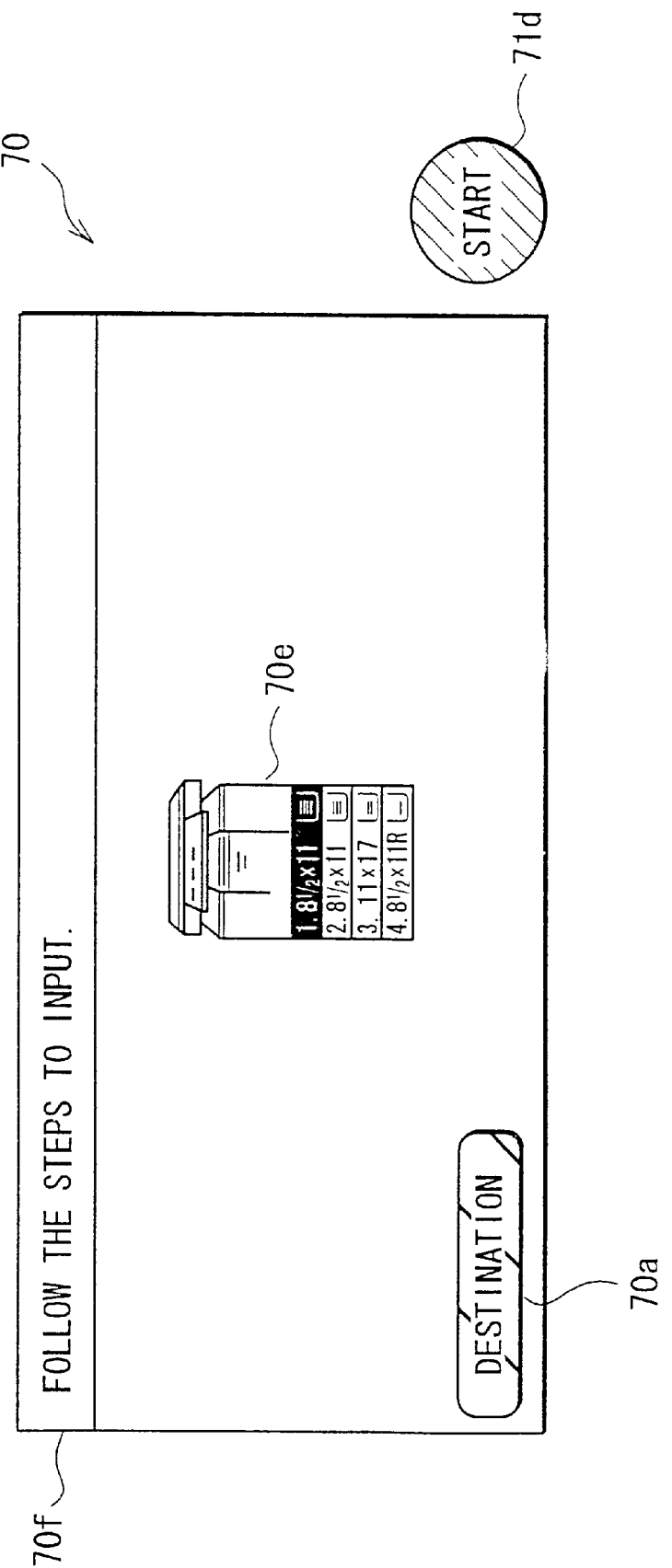
FIG. 22 is an explanatory drawing showing still another display example of the display section and the start key in the control panel.
Figure 23:
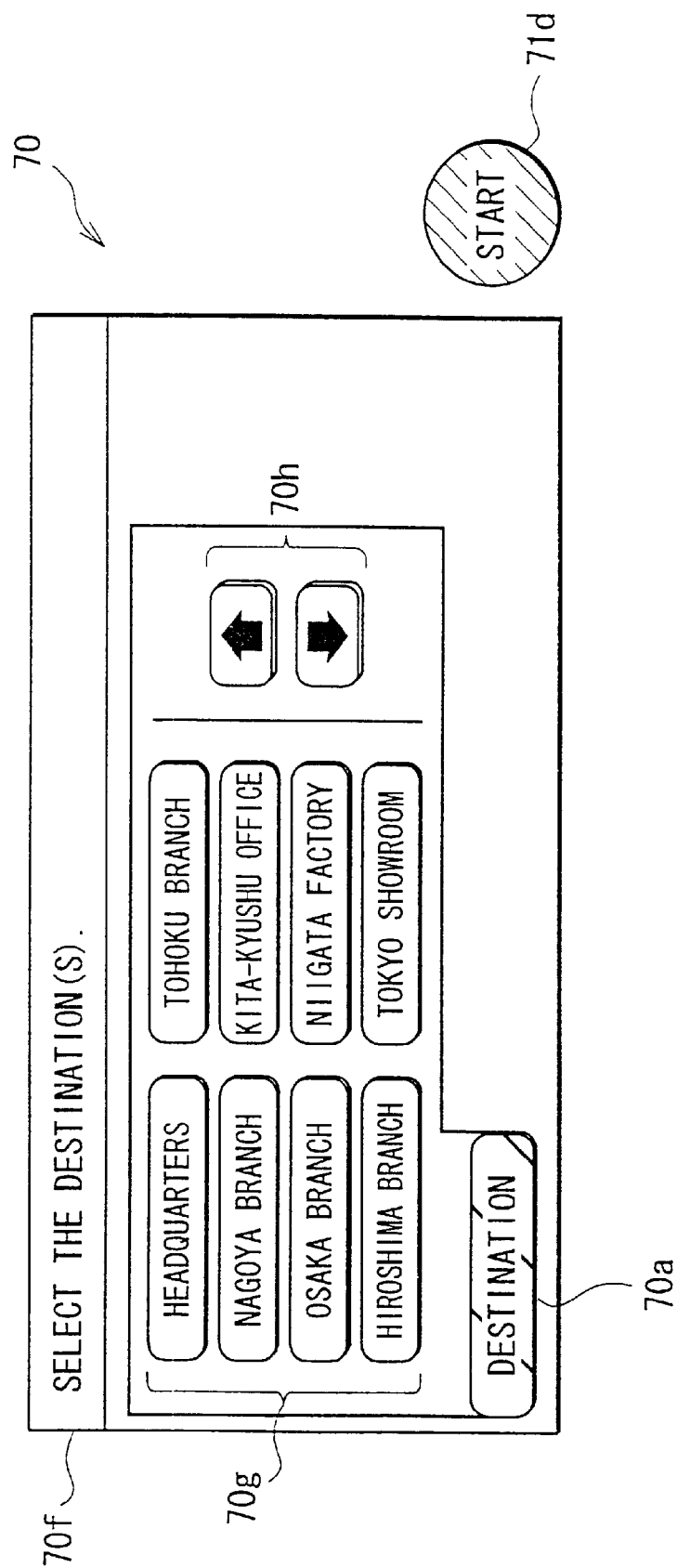
FIG. 23 is an explanatory drawing showing still another display example of the display section and the start key in the control panel.

First, when the fax mode key 72b is selected, as shown in FIG. 22, the display 70 displays the destination key 70a, that is the key to display the first conditional settings, is displayed in purple on the left end of the downside of the display 70.

Here, when the destination key 70a is pressed, as shown in FIG. 18, the destination specifying key group 70g for setting a destination of transmittance, and the scroll key group 70h are displayed, and in addition, the comment display section 70f displays a message such as "select the address(es)".

Figure 24:
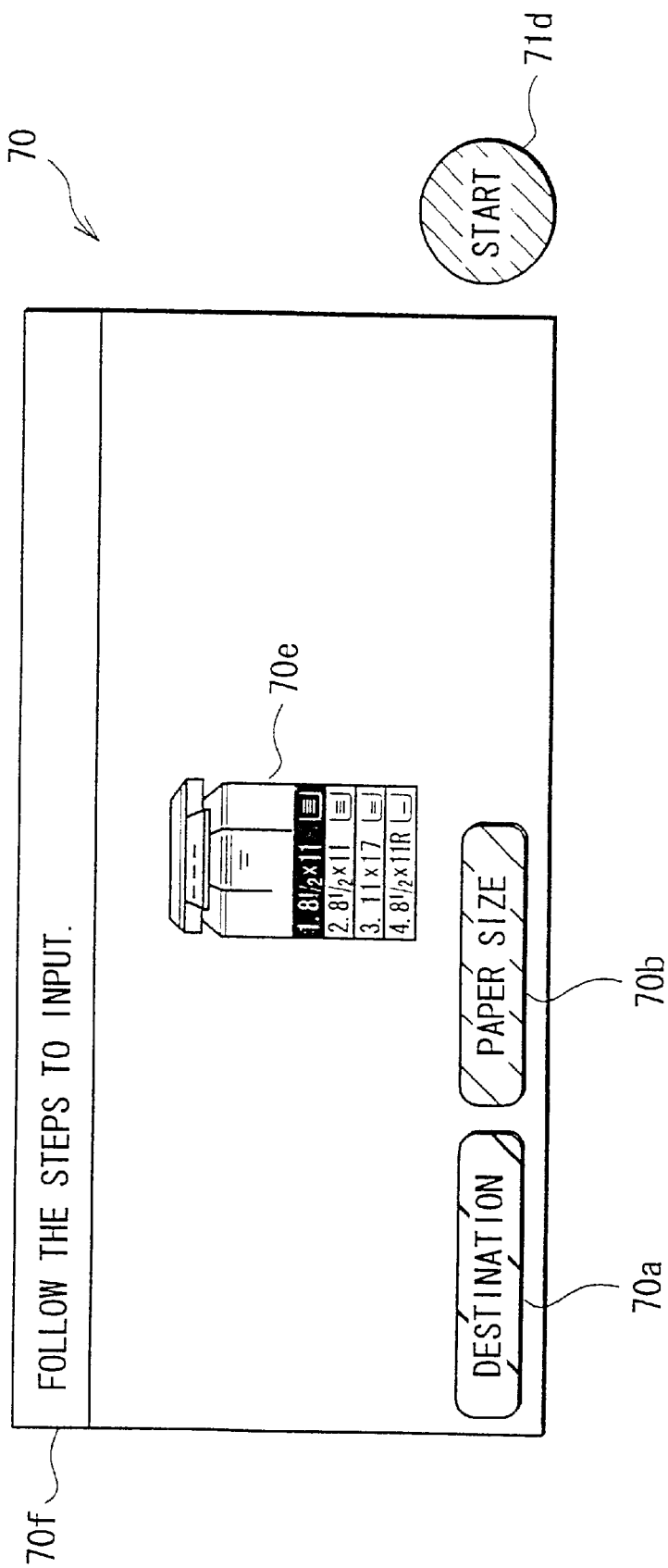
FIG. 24 is an explanatory drawing showing still another display example of the display section and the start key in the control panel.

When a user selects a destination specifying key out of the destination specifying key group 70g so as to complete the setting of the destination, as shown in FIG. 24, the display of the destination key group 70g disappears while maintaining the display of the destination key 70a. Then, the originally displayed device image 70e of a combined machine is displayed again, while displaying the paper size key 70b in violet in a position adjacent to the right hand side of the destination key 70a.

Figure 25:
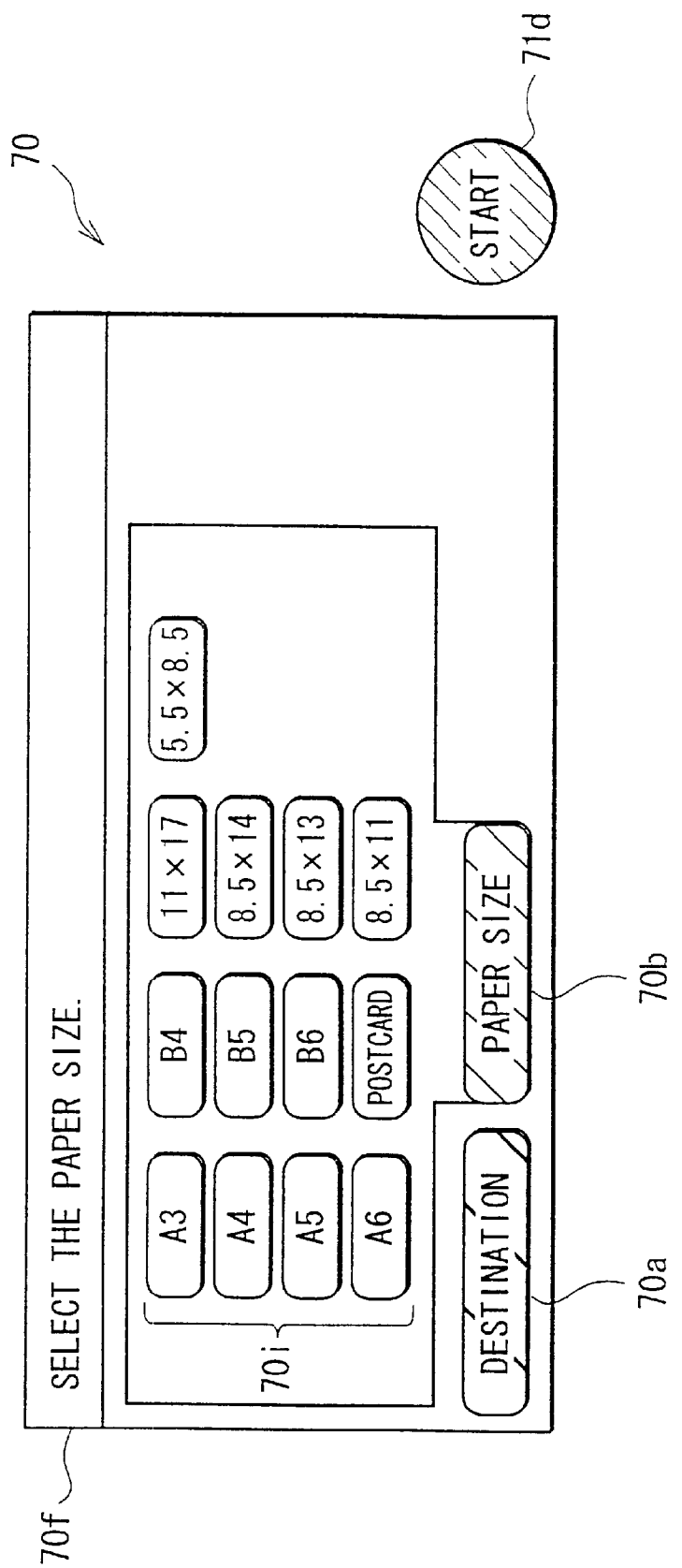
FIG. 25 is an explanatory drawing showing still another display example of the display section and the start key in the control panel.

Here, when the user presses the paper size key 70b, as shown in FIG. 25, while maintaining display of the destination key 70a, the paper size specifying key group 70i is displayed. The paper size specifying key group 70i is made up of a plurality of paper size specifying keys respectively representing various paper sizes. When the user selects one of the paper size specifying keys which corresponds to the size of an original document, the paper size is set.

Figure 26:
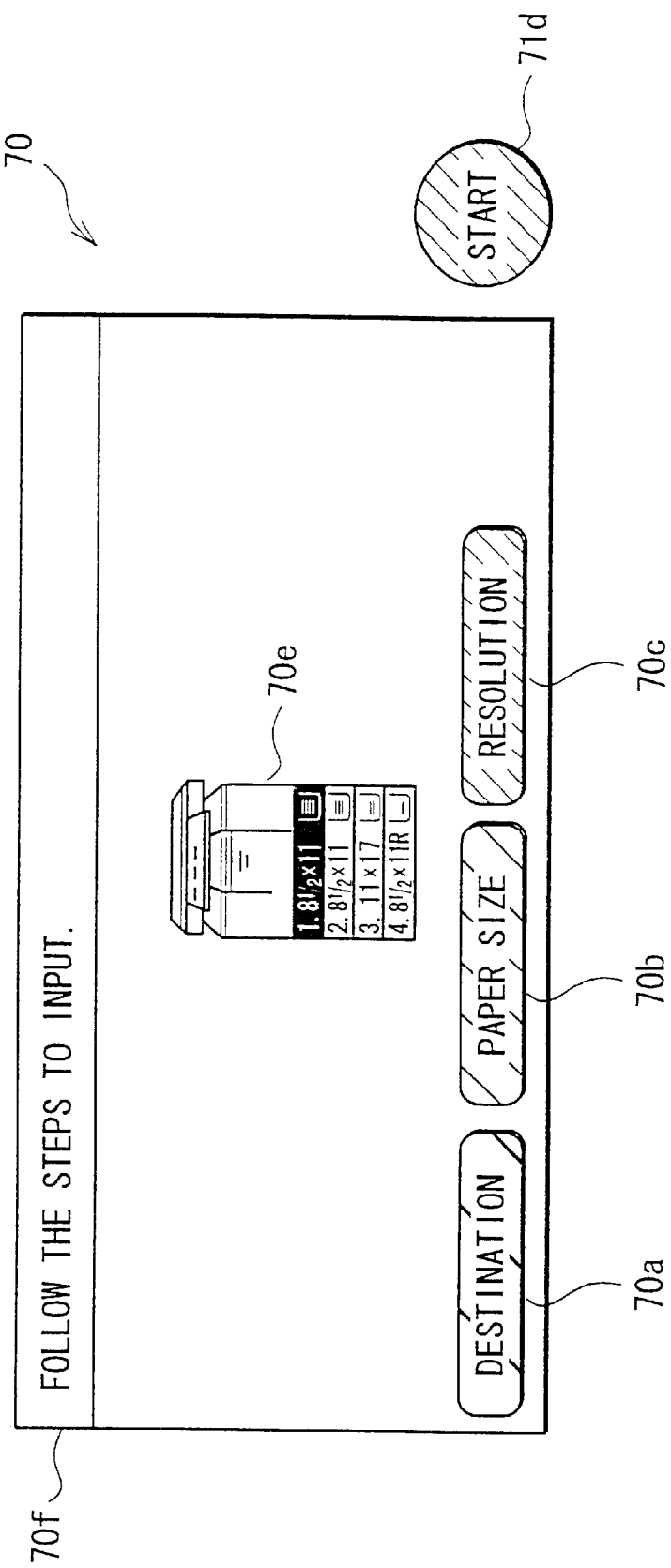
FIG. 26 is an explanatory drawing showing still another display example of the display section and the start key in the control panel.

When the paper size is set, as shown in FIG. 26, the display of the paper size specifying key group 70i disappears, while maintaining the display of the destination key 70a and the paper size key 70b, the settings of which are completed. Then, the device image 70e is displayed again, while displaying the resolution key 70c in blue adjacent to the right hand side of the paper size key 70b.

Figure 27:
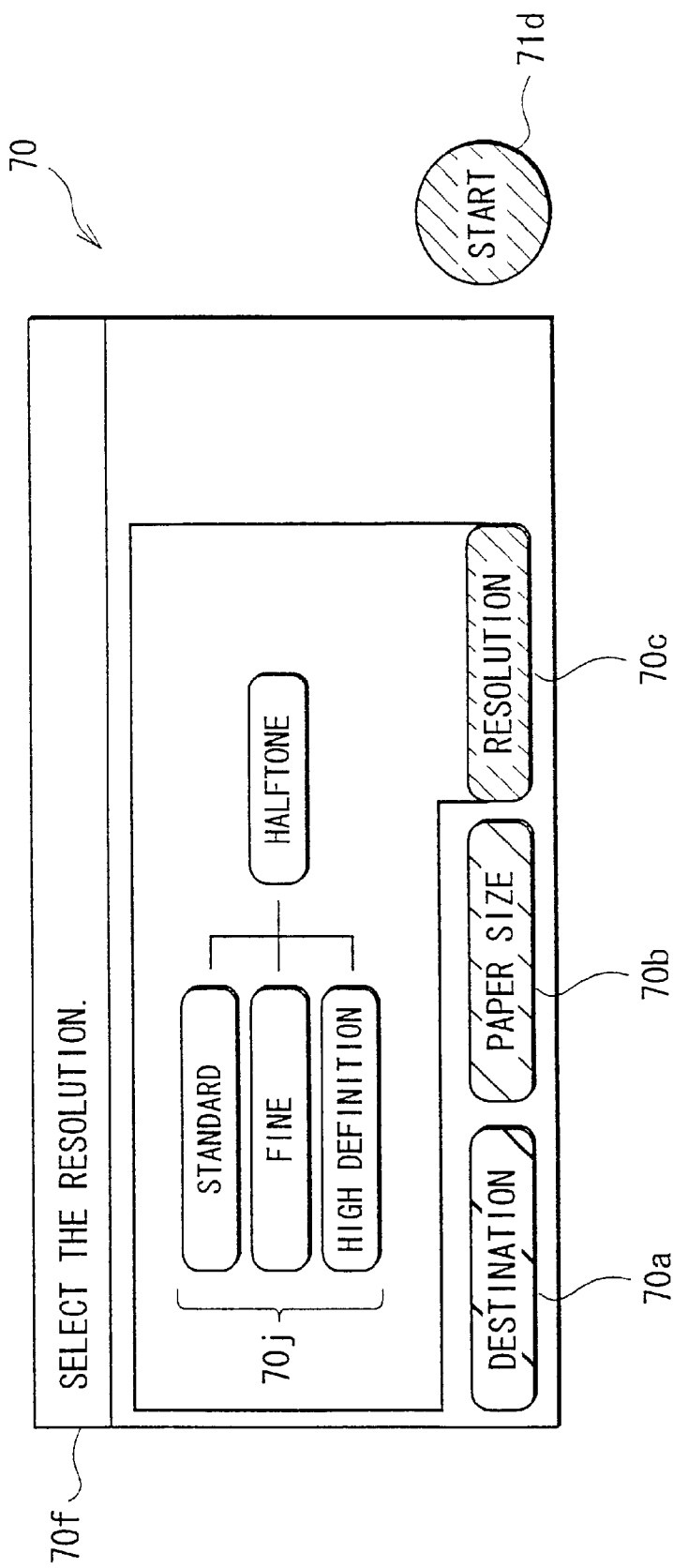
FIG. 27 is an explanatory drawing showing still another display example of the display section and the start key in the control panel.

Here, when the user presses the resolution key 70c, as shown in FIG. 27, the resolution specifying key group 70j is displayed. The resolution specifying key group 70j is made up of a plurality of resolution specifying keys respectively representing various levels of resolution. When the user selects one of the resolution specifying keys which corresponds to one level of resolution, the resolution is set.

Figure 28:
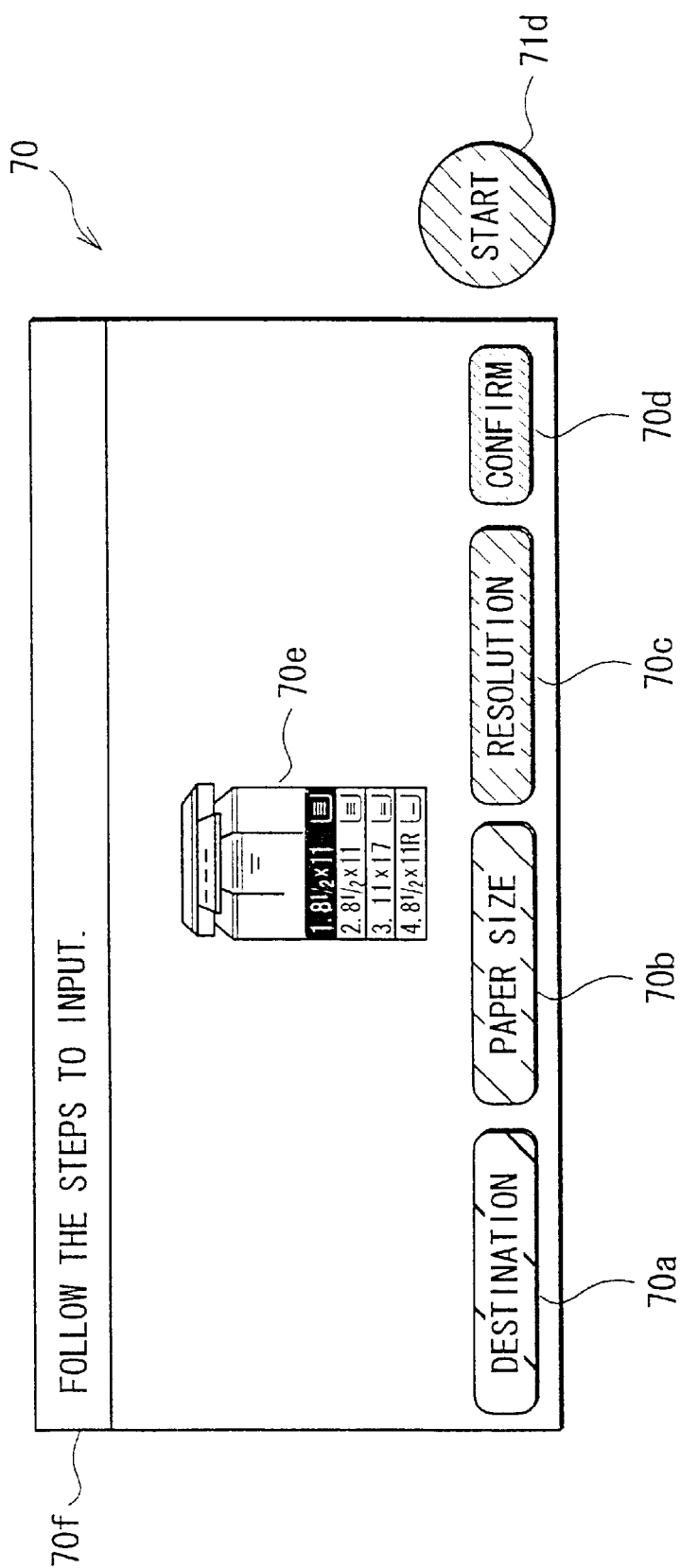
FIG. 28 is an explanatory drawing showing still another display example of the display section and the start key in the control panel.

When the resolution is set, as shown in FIG. 28, the display of the resolution specifying. key group 70j disappears while maintaining the display of the destination key 70a, the paper size key 70b and the resolution key 70c, the settings of which are completed. Then, the device image 70e is displayed again, while displaying the confirmation key 70c in bluish green adjacent to the right hand side of the resolution key 70c.

Figure 29:
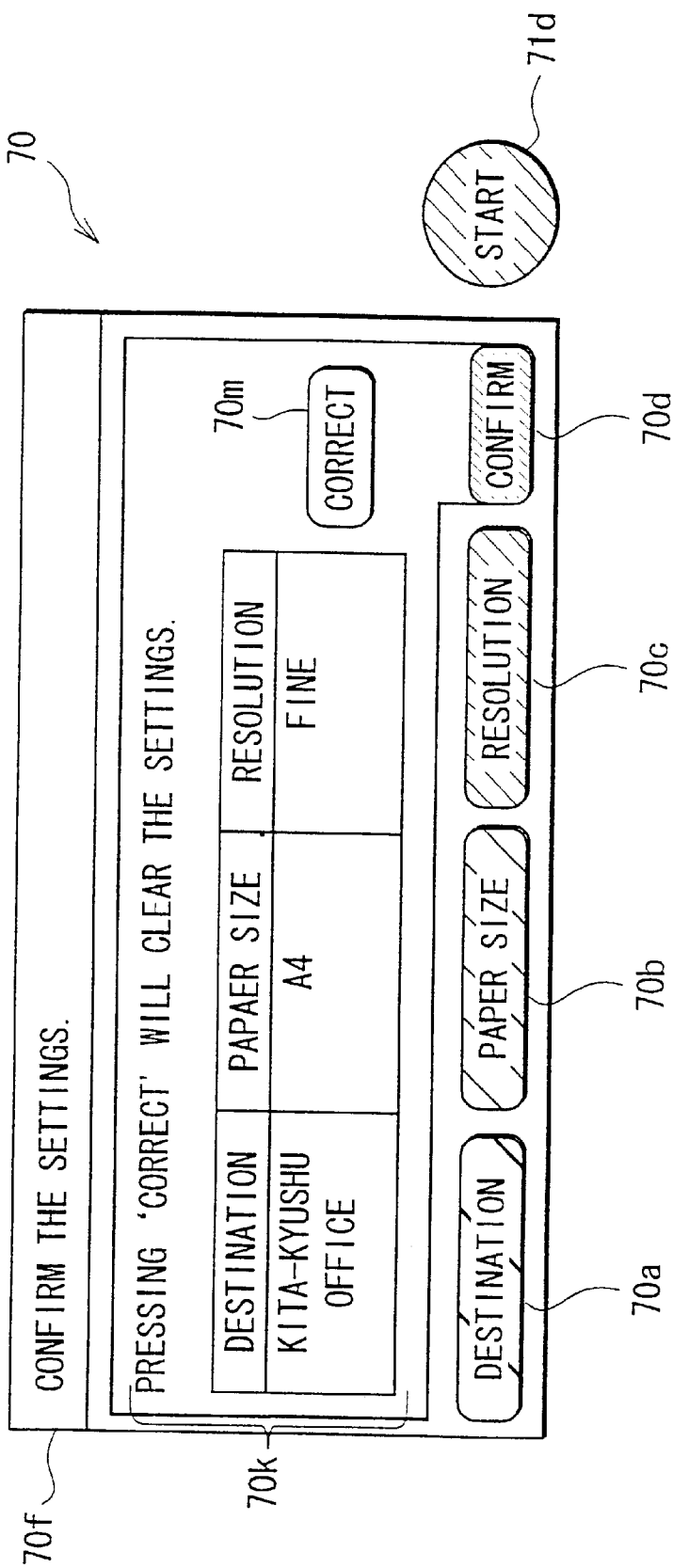
FIG. 29 is an explanatory drawing showing still another display example of the display section and the start key in the control panel.

Here, when the user presses the confirmation key 70d, as shown in FIG. 29, the selection contents display section 70k is displayed. The selection contents display section 70k displays a list of setting contents which have been set hitherto, and the correction key 70m for correcting the setting conditions. The user, after confirming the setting conditions, may correct the setting conditions by pressing the correction key 70m as required. In the end, by pressing the start key 71d which has the display color of green, fax transmission based on the setting conditions is carried out.

In the present Third Embodiment, of the plurality of display keys described above are, as in the Second Embodiment, only the keys required for conditional settings are displayed, and further, the keys for the completed conditional settings are remained on the display. Consequently, as is clear from FIGS. 22 through 29, as operational procedures develop, there is an increase in the display of the keys for display which are aligned in line, thereby enabling a user to grasp to which stage of the whole operations, from the beginning to the end, a current conditional setting belongs, and also clarifying as to which conditions settings have been completed.

(A Fourth Embodiment of the Control Panel)

In the present embodiment, as in the Third Embodiment, it is arranged such that only the keys to be displayed for setting necessary conditions are displayed as required, while maintaining the display of the keys for display, the settings of which have been completed, as it is, and further, another feature of the present embodiment is such that, in order to clarify the completion of settings, hues in display are changed. Note that, the other display contents and the operational procedures are the same as those explained in the First through Third Embodiments, and therefore, the same explanation will be omitted here. In addition, components having the same functions as those explained in the First through Third Embodiments will be given the same reference symbols.

Figure 30:
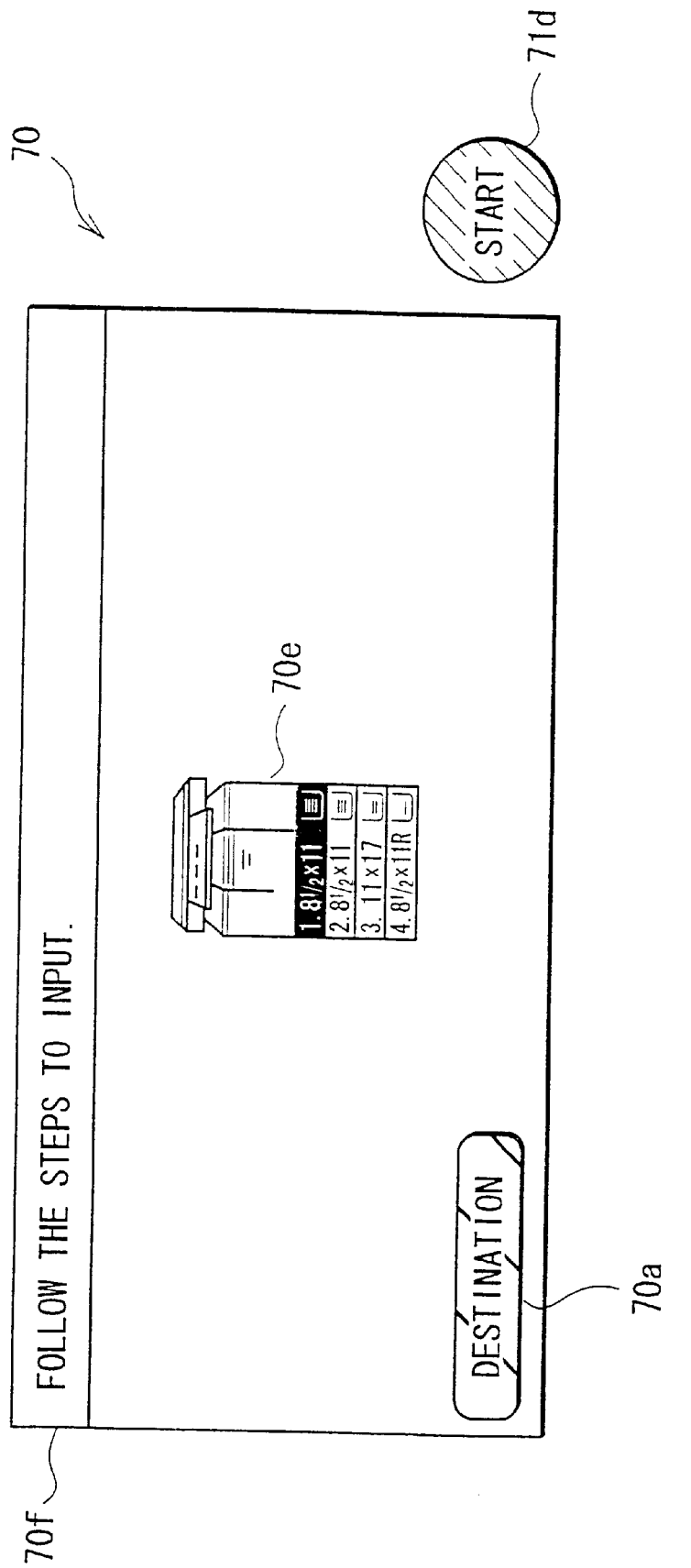
FIG. 30 is an explanatory drawing showing still another display example of the display section and the start key in the control panel.

First, when the fax mode key 72b is selected, as shown in FIG. 30, the display 70 displays the destination key 70a, that is the key to display the first conditional settings, is displayed in purple on the left end of the downside of the display 70.

Figure 31:
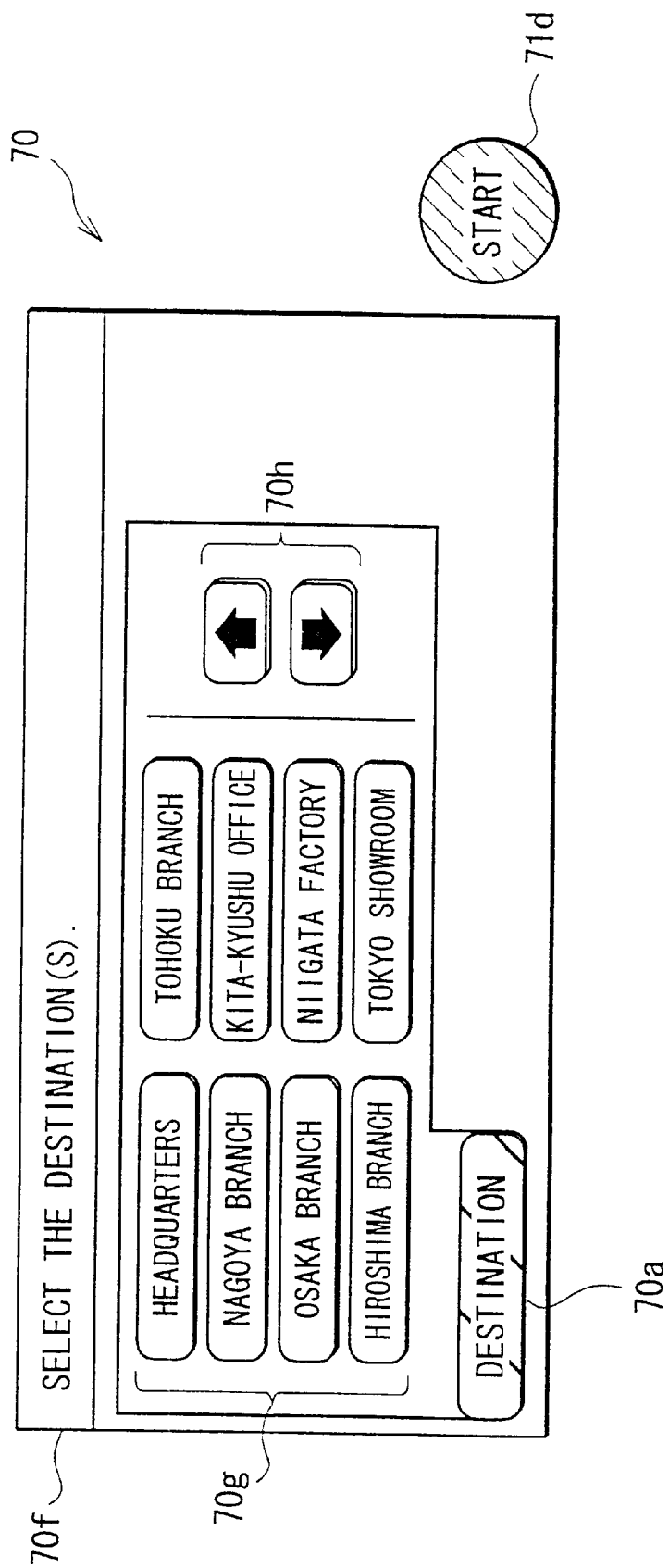
FIG. 31 is an explanatory drawing showing still another display example of the display section and the start key in the control panel.

Here, when the destination key 70*a* is pressed, as shown in FIG. 31, the destination specifying key group 70*g* for setting a destination of transmittance, and the scroll key group 70*h* are displayed. In addition, the comment display section 70*f* displays a message such as "select the address (es)".

Figure 32:
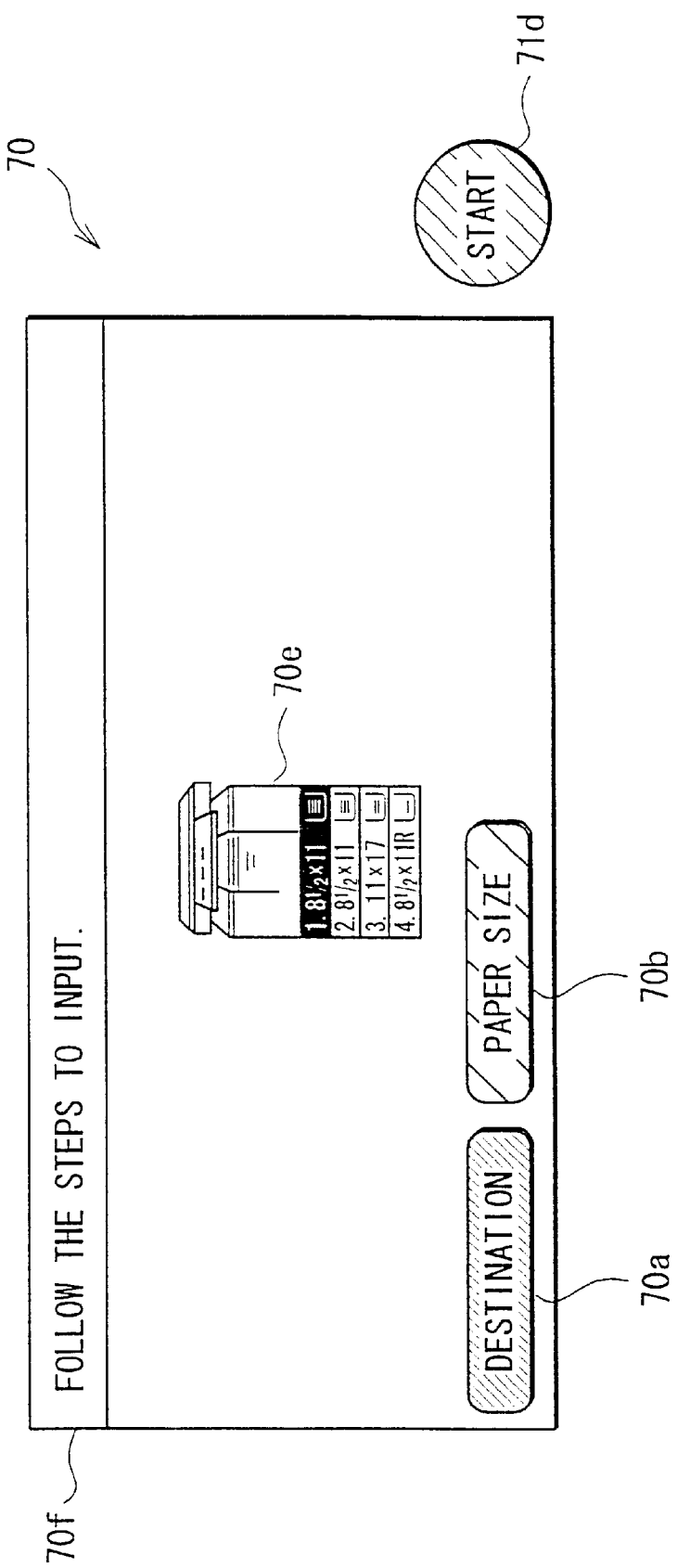
FIG. 32 is an explanatory drawing showing still another display example of the display section and the start key in the control panel.

When a user selects a destination specifying key out of the destination specifying key group 70*g* so as to complete the setting of the destination, as shown in FIG. 32, the display of the destination key group 70*g* disappears while maintaining the display of the destination key 70*a*. Further, the display color of the destination key 70*a* changes from purple to green, i.e., to the color of the start key 71*d*. Then, the originally displayed device image 70*e* of a combined machine is displayed again, while displaying the paper size key 70*b* in violet in a position adjacent to the right hand side of the destination key 70*a*.

Figure 33:
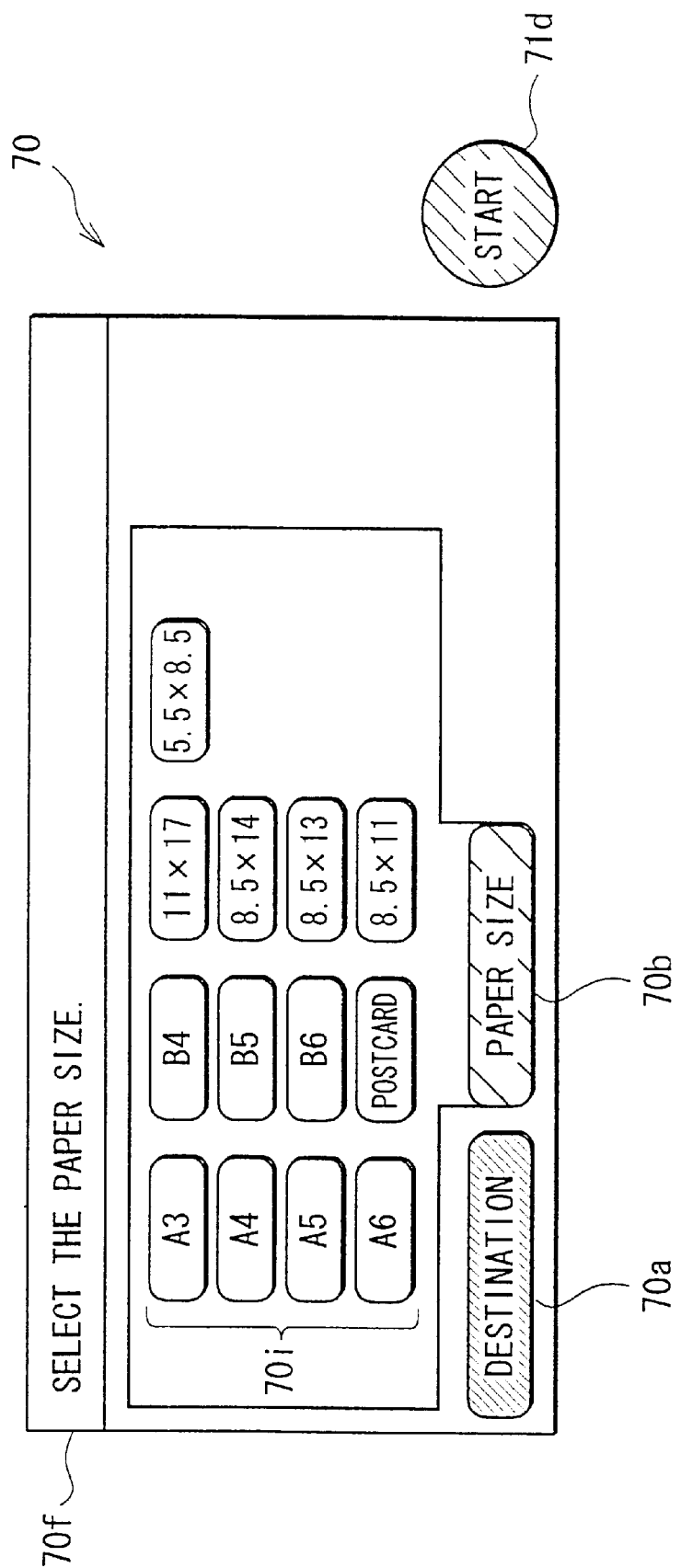
FIG. 33 is an explanatory drawing showing still another display example of the display section and the start key in the control panel.

Here, when the user presses the paper size key 70*b*, as shown in FIG. 33, while maintaining display of the destination key 70*a*, the paper size specifying key group 70*i* is displayed. The paper size specifying key group 70*i* is made up of a plurality of paper size specifying keys respectively representing various paper sizes. When the user selects one of the paper size specifying keys which corresponds to the size of an original document, the paper size is set.

Figure 34:
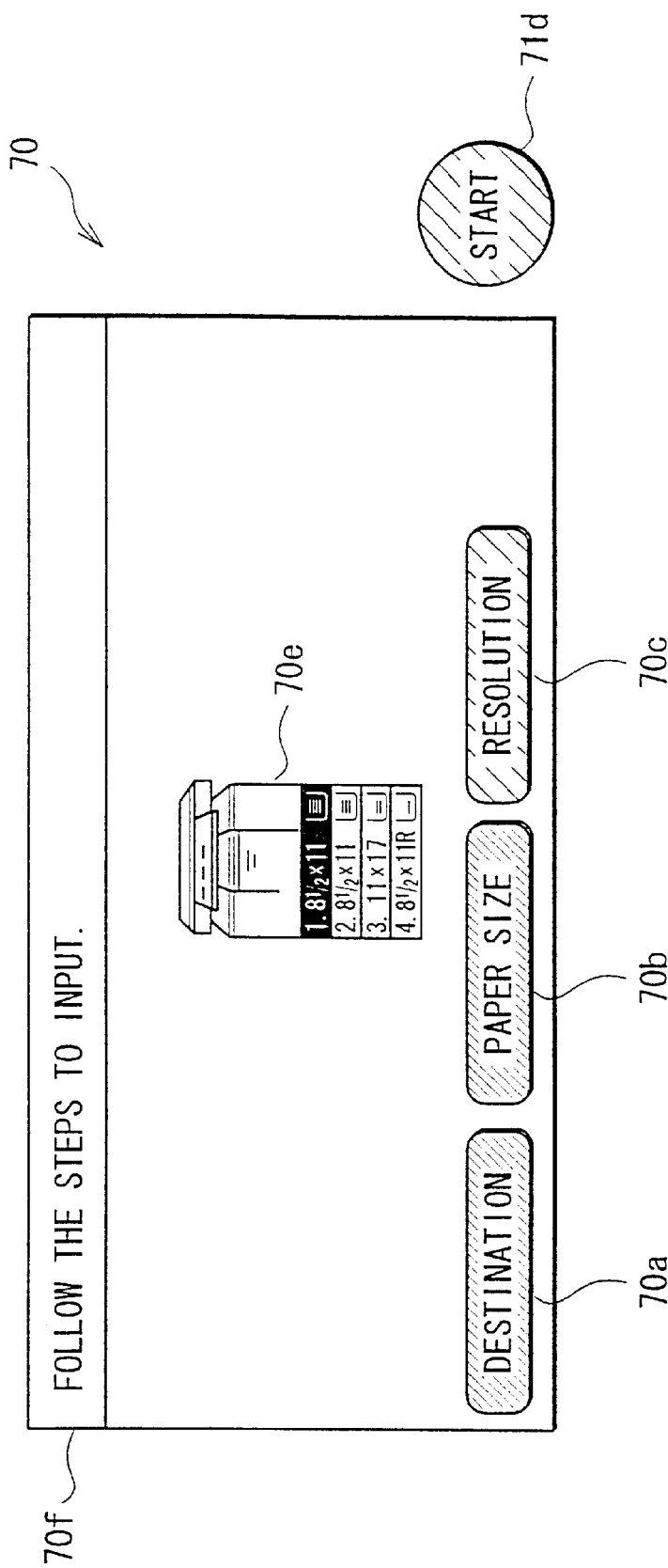
FIG. 34 is an explanatory drawing showing still another display example of the display section and the start key in the control panel.

When the paper size is set, as shown in FIG. 34, the display of the paper size specifying key group 70*i* disappears, while maintaining the display of the destination key 70*a* and the paper size key 70*b*, the settings of which are completed. Further, the display color of the paper size key 70*b* changes from violet to green. Then, the device image 70*e* is displayed again, while displaying the resolution key 70*c* in blue adjacent to the right hand side of the paper size key 70*b*.

Figure 35:
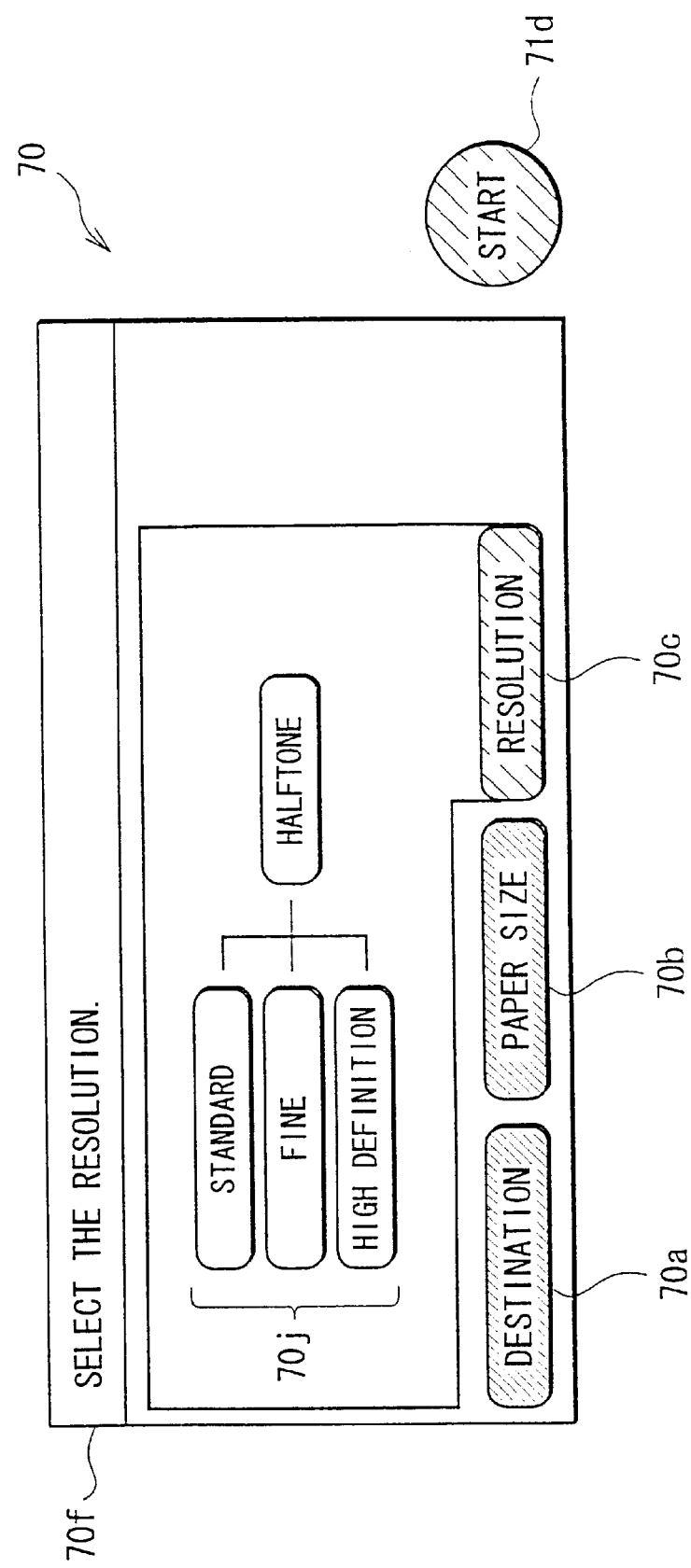
FIG. 35 is an explanatory drawing showing still another display example of the display section and the start key in the control panel.

Here, when the user presses the resolution key 70*c*, as shown in FIG. 35, the resolution specifying key group 70*j* is displayed. The resolution specifying key group 70*j* is made up of a plurality of resolution specifying keys respectively representing various levels of resolution. When the user selects one of the resolution specifying keys which corresponds to one level of resolution, the resolution is set.

Figure 36:
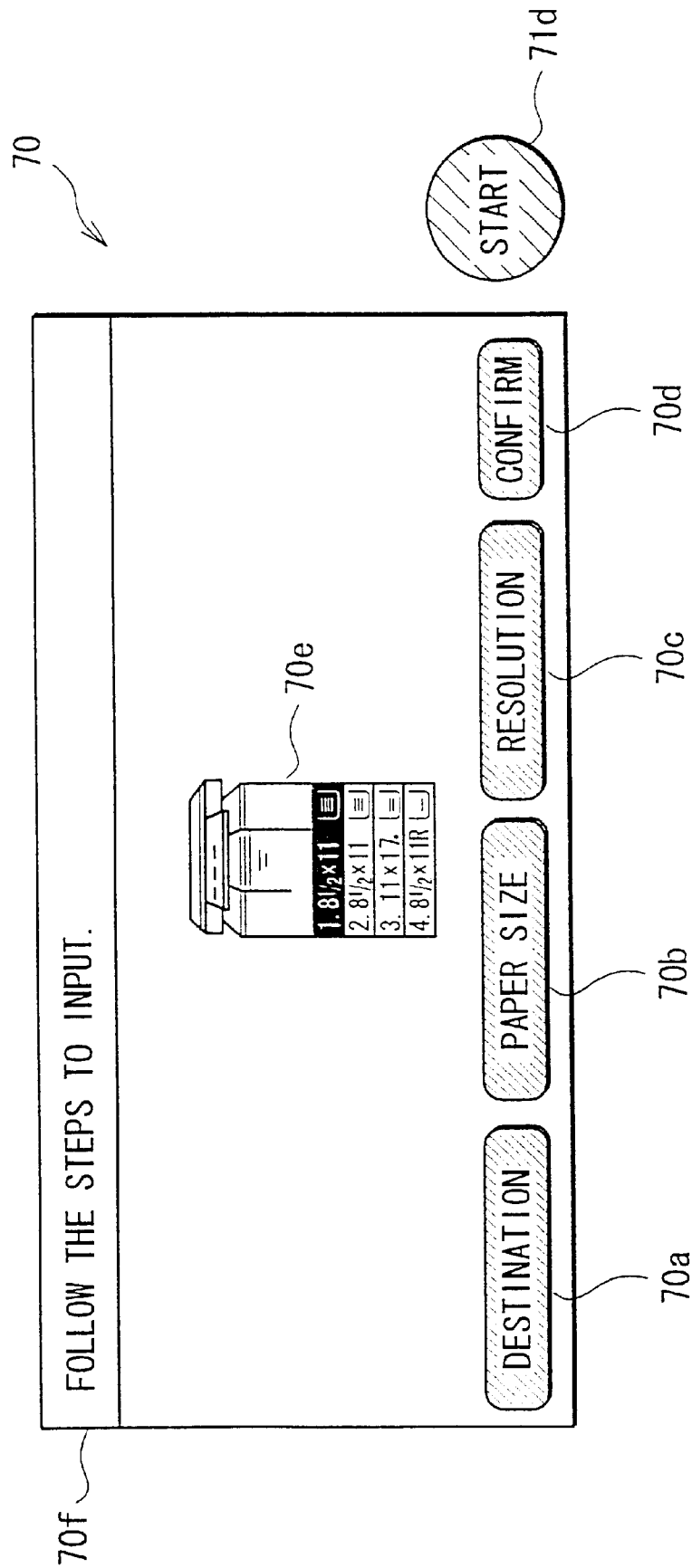
FIG. 36 is an explanatory drawing showing still another display example of the display section and the start key in the control panel.

When the resolution is set, as shown in FIG. 36, the display of the resolution specifying key group 70*j* disappears while maintaining the display of the destination key 70*a*, the paper size key 70*b* and the resolution key 70*c* intact, the settings of which are completed. Further, the display color of the resolution key 70*c* changes from blue to green. Then, the device image 70*e* is displayed again, while displaying the confirmation key 70*c* in bluish green adjacent to the right hand side of the resolution key 70*c*.

Figure 37:
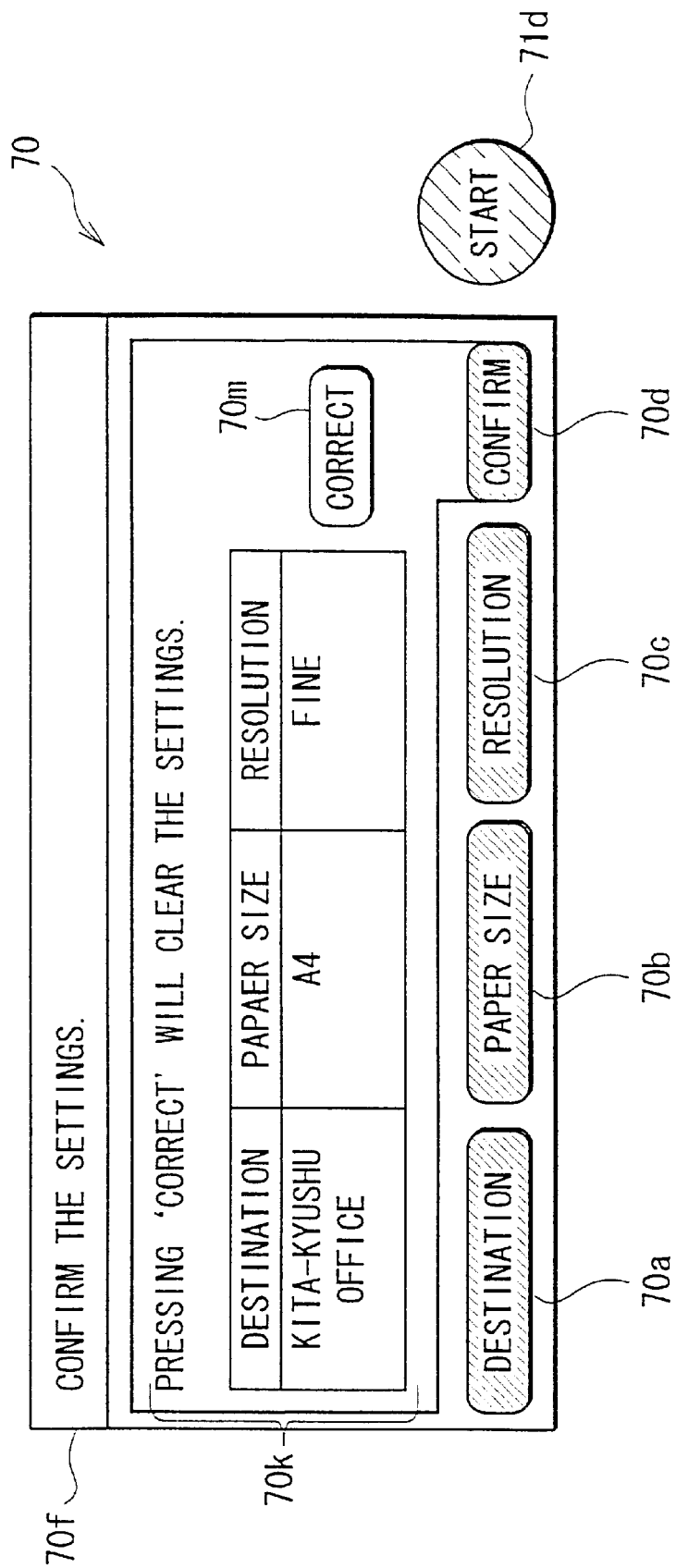
FIG. 37 is an explanatory drawing showing still another display example of the display section and the start key in the control panel.

Here, when the user presses the confirmation key 70*d*, as shown in FIG. 37, the selection contents display section 70*k* is displayed. The selection contents display section 70*k* displays a list of setting contents which have been set hitherto, and the correction key 70*m* for correcting the setting conditions. The user, after confirming the setting conditions, may correct the setting conditions by pressing the correction key 70*m* as required. In the end, by pressing the start key 71*d* which has the display color of green, fax transmission based on the setting conditions is carried out.

In the present embodiment, of the plurality of display keys described above are, as in the Third Embodiment, only the keys required for conditional settings are displayed, and further, the keys for the completed conditional settings are remained on the display intact. However, at a time when settings are completed, the display color of the keys for the completed conditional settings are arranged to change so as to have the color of the start key 71*d*, for example. Consequently, as is clear from FIGS. 30 through 37, as operational procedures develop, there is an increase in the display of the keys for display which are aligned in line while changing the display color into green, thereby enabling a user to grasp to which stage of the whole operations, from the beginning to the end, a current conditional setting belongs, and also, further clarifying as to which conditions settings have been completed.

Note that, the display colors of the display keys after the completion of settings are to be appropriately selected in accordance with conditions such as conditions for use, and not limited to the foregoing embodiment. For example, in the present embodiment, explanation has been made through an example in which the display keys for the completed settings are changed into green which is the display color of the start key 71*d*, but such a change as to make a display color darker or lighter, i.e., a change in chroma may also be adopted.

Further, representing methods of a display color for each display key includes a method of solidly shading the inside of a frame, a hatching method and a halftone dot method. In addition, such methods as to modify the form of hatching or halftone dots may also be adopted, and further, a combination of the foregoing methods may be adopted as well.

Explanation has been made through the First through Fourth Embodiments of the control panel as above, but embodiments of the present invention are not limited thereto. For example, in the foregoing embodiments, explanation was made with reference to the control panel of the combined machine having the touch panel type display 70, and controllers made up of actual keys such as the condition setting key group 71 and the mode selection key group 72, as an example; however, an arrangement having the completely separated display and controller sections or an arrangement which is entirely made up of a touch panel alone may also be adopted.

For example, in the arrangement having the completely separated display and controller sections, it is simply needed that hues in the colors of keys, buttons, etc., which are included in the controller section are arranged to vary. Further, it may also be arranged such that operation history is ready for display, and the operation history is displayed in the same colors as those of the keys and buttons. On the other hand, in the arrangement entirely made up of a touch panel alone, it may be arranged such that the touch panel displays the condition setting key group 71 including keys such as the ten-key numerical keypad 71*a* and the start key 71*d*, and the mode selection key group 72 for selecting modes.

As explained, the control device according to the present embodiment enables a user to readily and accurately grasp the selection status (sequence of selecting or execution instructing steps) of each selection item, only with a look at the control device, and as a result, the user is no longer required to accurately memorize details such as a sequence of numerous setting items and all the necessary setting items, thereby conveniently and surely operating the device.

Furthermore, because of a variation in hues and a positional relationship thereof, an operating sequence in each step becomes obvious, and as a result, even when an operation of electronic equipment is obliged to include complicated steps, associating a hue with a disposition enables easy and secure operations.

Further, even when using multi-function electronic equipment having a relatively large number of selection items (setting items), it is possible to apply the same variation in hues to the item selection means and the execution instructing means. Therefore, when switching modes, an operation may be performed based on a relationship of sequential positions according to the sequence of variation in hues. As a result, a user is no longer required to memorize details such as a dedicated operation in an individual processing mode, name of each setting item, and the sequence thereof, thus readily operating multi-function electronic equipment.

Further, with the control device of the present invention, a user can recognize a selecting sequence (operating sequence) of steps visually with ease, while more clearly recognizing both the beginning and the end of a step, and a controller section which requires operations in all the steps, from the beginning to the end.

Further, with the control device of the present invention, a change in display contents and a selection between display/non-display can be made, thereby allowing a desired item selection means made up of keys and the like to be displayed in accordance with a status, and readily changing a display color. In addition, even when a change occurs in the facilities of electronic equipment, modifying a setting such as a display program of the control device makes it possible to readily change display contents so as to make them adjust to the change.

Further, a more concise operation can be realized, and operating contents can be checked through display means in accordance with an operation, thereby more surely operating.

Further, with the control device of the present invention, the display position of item selection means made up of keys and the like can be arranged to gradually shift, from the first operation to the last operation, with respect to the side of execution instructing means, and further, a user is enabled to grasp as to which stage of the whole operations, from the beginning to the end, a current operational procedure belongs, which is obvious, while readily recognizing item selection means to be operated next.

Further, the present invention has an arrangement in which the leading edge of the display position of item selection means made up of keys and the like gradually shifts, from the first operation to the last operation, with respect to the side of execution instructing means, and further, a user is enabled to grasp as to which stage of the whole operations, from the beginning to the end, a current operational procedure belongs, which is obvious, while readily recognizing completely set items and item selection means to be operated next.

Further, the present invention has an arrangement in which the completion of settings through an operation in each step is more clearly recognized, and the effect of preventing waste of time such as setting the same selection item twice can be expected, thus enabling a user to more concretely and clearly recognize the completion of settings through an operation in each step, thus preventing waste of time such as setting the same selection item twice.

Further, generally, colors such as red and yellow are used for warning (warning colors), and therefore, these colors have a relatively high visibility for a user. However, excluding such warning colors enables a user to prevent occurrence of a false operation, thereby enabling the user to operate more surely and preventing the user from unnecessary anxieties.

Further, as discussed, by applying the present invention to a control device of a combined machine having a particularly high-level and complicated facilities, and in case where a large number of users share a small number of the combined machines, the combined- machine, the operation of which tends to be complicated, can be operated easily and surely, thus preventing such problems as to trouble other users and reduce availability.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display control device of an image forming device capable of simultaneously carrying out jobs corresponding to a plurality of different processing modes, which comprises information input means for inputting jobs corresponding to the plurality of different processing modes, and multi-color display means capable of displaying in different colors information on a job according to one of the different processing modes inputted, wherein:

when said multi-color display means displays information on a job according to a first processing mode in a display color representing said first processing mode, a new input of information on a job according to a second processing mode causes said multi-color display means to display for the first time said information on the job according to said second processing mode in a display color representing said second processing mode together with said information on the job according to said first processing mode.

2. A control device of electronic equipment capable of carrying out jobs according to a plurality of different processing modes, which comprises information input means for inputting information on said jobs, and multi-color display means for displaying information on said jobs in different colors respectively representing processing modes corresponding to the jobs, wherein:

said multi-color display means simultaneously displays information on a job in process and information on a standby job with programmed processes, in display colors respectively representing processing modes corresponding to the jobs and said information on standby job with programmed processes is displayed for the first time when said job is assigned as a new job.

3. The control device of electronic equipment as set forth in claim 2, wherein in a vicinity of said multi-color display means are provided processing mode selection means for selecting the corresponding processing modes, and each of said processing mode selection means is displayed in a display color representing the corresponding processing mode.

4. The control device of electronic equipment as set forth in claim 2, wherein said multi-color display means displays the information on a job in process in a display area which is larger than that of the information on standby jobs with programmed processes.

5. The control device of electronic equipment as set forth in claim 2, wherein said multi-color display means displays the information on a job in process so that it partially conceals display of the information on standby jobs with programmed processes.

6. The control device of electronic equipment as set forth in claim 5, characterized in that, when instructing to switch displays, said multi-color display means displays portions of the information on standby jobs with programmed processes, concealed by display of the information on a job in process.

7. The control device of electronic equipment as set forth claim 2, wherein said multi-color display means includes a touch sensor.

8. The control device of electronic equipment as set forth in claim 2, wherein said multi-color display means displays information on a newly inputted job while flashing it.

9. The control device of electronic equipment as set forth in claim 2, wherein said electronic equipment is an image forming device capable of carrying out at least two of processing modes including a copying mode, a printer mode and a fax mode.

10. A control device of electronic equipment capable of carrying out a plurality of different processing modes, comprising:
    processing mode selection means for selecting a desired processing mode from the plurality of processing modes;
    item selection means which are provided so as to correspond to a plurality of setting items to be set for the execution of said processing modes; and
    execution instructing means for instructing the device to carry out said processing mode, the control device,
    wherein said item selection means and said execution instructing means are adjacently disposed in the sequence of selection or execution instructing steps, and a display color of each of said item selection means forms part of a sequential variation in hues.

11. The control device of electronic equipment as set forth in claim 10, further comprising subordinate item selection means for selecting a subordinate setting item to each of the plurality of setting items selected by said item selection means.

12. The control device of electronic equipment as set forth in claim 11, wherein a touch panel type display device includes said subordinate item selection means.

13. The control device of electronic equipment as set forth in claim 11, wherein said item selection means corresponding to setting items to be set in the next step are displayed, and said subordinate setting items is selected through said subordinate item selection means so as to set setting items, and thereafter, said item selection means are brought out of display.

14. The control device of electronic equipment as set forth in claim 11, wherein said item selection means corresponding to setting items to be set in the next step are displayed, and said subordinate setting item is selected through said subordinate item selection means so as to specify setting items, thereafter maintaining the display of said item selection means.

15. The control device of electronic equipment as set forth in claim 14, wherein maintaining display of said item selection means including the specified setting items results in a variation in hues of the display colors of said item selection means.

16. The control device of electronic equipment as set forth in claim 15, wherein the hues of the display colors of the item selection means including the specified setting items change so as to have substantially the same hue as that of the display color of said execution instructing means.

17. The control device of electronic equipment as set forth in claim 10, wherein a first one of said item selection means which is initially set is displayed in a color including a most different hue from that of the display color of said execution instructing means.

18. The control device of electronic equipment as set forth in claim 10, wherein a touch panel type display device includes one or both of said processing mode selection means and said item selection means.

19. The control device of electronic equipment as set forth in claim 10, wherein said display colors are represented as a variation in hues excluding warning colors which include red or yellow based colors.

20. The control device of electronic equipment as set forth in claim 10, wherein said item selection means and said execution instructing means are adjacently disposed in line in the sequence of selection or execution instructing steps.

21. The control device of electronic equipment as set forth in claim 10, wherein said electronic equipment is an image forming device capable of carrying out at least two of processing modes including a copying mode, a printer mode and a fax mode.

* * * * *